US012010134B2

(12) United States Patent
Gamble et al.

(10) Patent No.: US 12,010,134 B2
(45) Date of Patent: *Jun. 11, 2024

(54) SYSTEMS AND METHODS OF ADAPTIVELY SECURING NETWORK COMMUNICATION CHANNELS

(71) Applicant: ROYAL BANK OF CANADA, Toronto (CA)

(72) Inventors: Jamie Gamble, Toronto (CA); Nariman Mammadli, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,937

(22) Filed: Mar. 17, 2023

(65) Prior Publication Data
US 2023/0231869 A1    Jul. 20, 2023

Related U.S. Application Data

(63) Continuation of application No. 17/033,232, filed on Sep. 25, 2020, now Pat. No. 11,627,153.
(Continued)

(51) Int. Cl.
*H04L 9/40* (2022.01)

(52) U.S. Cl.
CPC ...... *H04L 63/1425* (2013.01); *H04L 63/1416* (2013.01); *H04L 63/1433* (2013.01)

(58) Field of Classification Search
CPC ............. H04L 63/1425; H04L 63/1416; H04L 63/1433
(Continued)

(56) References Cited

U.S. PATENT DOCUMENTS 8,682,812 B1 * 3/2014 Ranjan .................. H04L 43/028
706/12
11,003,773 B1 * 5/2021 Fang ................... H04L 63/0263
(Continued)

OTHER PUBLICATIONS

United States Patent and Trademark Office, Notice of Allowance for U.S. Appl. No. 17/033,232 dated Dec. 7, 2022.

*Primary Examiner* — Badri Narayanan Champakesan
(74) *Attorney, Agent, or Firm* — Norton Rose Fulbright Canada LLP

(57) ABSTRACT

Systems and methods for monitoring suspicious communication network traffic. The methods include obtaining data associated with a sequence of communication events transmitted via the communication network and determining an entropy approximation measure associated at least one event attribute for the sequence of communication events. The method includes generating a threat prediction value based on an anomaly classification model and the entropy approximation measure. The anomaly classification model is trained based on prior sequences of communication events to identify a non-outlier anomaly range associated with the at least one event attribute. The threat prediction value is generated based on classification of the entropy approximation measure relative to the non-outlier anomaly range associated with the at least one attribute for identifying a potential threat. The method includes transmitting a signal for communicating that the sequence is a potential threat within the communication network.

20 Claims, 11 Drawing Sheets

Related U.S. Application Data

(60) Provisional application No. 62/905,735, filed on Sep. 25, 2019.

(58) Field of Classification Search
USPC .......................................................... 726/23
See application file for complete search history.

(56) References Cited

U.S. PATENT DOCUMENTS

| | | | |
|---|---|---|---|
| 2010/0107254 A1* | 4/2010 | Eiland | H04L 63/1416 |
| | | | 726/23 |
| 2011/0067106 A1* | 3/2011 | Evans | G06F 21/552 |
| | | | 709/224 |
| 2015/0215334 A1* | 7/2015 | Bingham | H04L 63/1425 |
| | | | 726/23 |
| 2018/0013772 A1* | 1/2018 | Schmidtler | H04L 63/145 |
| 2019/0044963 A1* | 2/2019 | Rajasekharan | G06N 20/00 |
| 2019/0356679 A1* | 11/2019 | Sites | H04L 63/1416 |
| 2022/0174511 A1* | 6/2022 | Kvernvik | H04W 24/08 |

* cited by examiner

FIG. 8

| | | | | |
|---|---|---|---|---|
| xx | GET | http://xxx.rbc.com:80 | ?sipuri=x.x@rbc.com | 2019-08-01T09:09:00 |
| xx | GET | http://xxx.rbc.com:80 | ?sipuri=x.x@rbc.com | 2019-08-01T17:09:01 |
| xx | GET | http://xxx.rbc.com:80 | ?sipuri=x.x@rbc.com | 2019-08-02T09:08:58 |
| xx | GET | http://xxx.rbc.com:80 | ?sipuri=x.x@rbc.com | 2019-08-02T17:08:58 |
| xx | GET | http://xxx.rbc.com:80 | ?sipuri=x.x@rbc.com | 2019-08-05T09:09:26 |
| xx | GET | http://xxx.rbc.com:80 | ?sipuri=x.x@rbc.com | 2019-08-05T17:09:27 |
| xx | GET | http://xxx.rbc.com:80 | ?sipuri=x.x@rbc.com | 2019-08-06T09:08:26 |
| xx | GET | http://xxx.rbc.com:80 | ?sipuri=x.x@rbc.com | 2019-08-06T17:08:28 |
| xx | GET | http://xxx.rbc.com:80 | ?sipuri=x.x@rbc.com | 2019-08-14T09:08:47 |
| xx | GET | http://xxx.rbc.com:80 | ?sipuri=x.x@rbc.com | 2019-08-14T17:08:47 |
| xx | GET | http://xxx.rbc.com:80 | ?sipuri=x.x@rbc.com | 2019-08-15T09:09:27 |
| xx | GET | http://xxx.rbc.com:80 | ?sipuri=x.x@rbc.com | 2019-08-15T17:09:26 |
| xx | GET | http://xxx.rbc.com:80 | ?sipuri=x.x@rbc.com | 2019-08-16T09:08:55 |
| xx | GET | http://xxx.rbc.com:80 | ?sipuri=x.x@rbc.com | 2019-08-16T17:08:55 |
| xx | GET | http://xxx.rbc.com:80 | ?sipuri=x.x@rbc.com | 2019-08-19T09:08:31 |
| xx | GET | http://xxx.rbc.com:80 | ?sipuri=x.x@rbc.com | 2019-08-19T17:09:31 |
| xx | GET | http://xxx.rbc.com:80 | ?sipuri=x.x@rbc.com | 2019-08-20T09:09:39 |
| xx | GET | http://xxx.rbc.com:80 | ?sipuri=x.x@rbc.com | 2019-08-20T17:09:39 |
| xx | GET | http://xxx.rbc.com:80 | ?sipuri=x.x@rbc.com | 2019-08-21T09:09:34 |
| xx | GET | http://xxx.rbc.com:80 | ?sipuri=x.x@rbc.com | 2019-08-21T17:09:36 |

800

900

| | | | |
|---|---|---|---|
| GET http://x.x.x.x:80 | /8saeoaar? d=%5bUNIQUE%5d&r=0 | 2019-08-01T17:10:29 | xx |
| GET http://x.x.x.x:80 | /7ivn7xu1? d=%5bUNIQUE%5d&r=0 | 2019-08-05T10:02:34 | xx |
| GET http://x.x.x.x:80 | /hpjiu7qa? d=127604492&r=0 | 2019-08-12T10:38:41 | xx |
| GET http://x.x.x.x:80 | /56hbe4g9? d=%5bUNIQUE%5d&r=0 | 2019-08-19T10:59:15 | xx |

FIG. 9

SYSTEMS AND METHODS OF ADAPTIVELY SECURING NETWORK COMMUNICATION CHANNELS

CROSS REFERENCE TO RELATED APPLICATIONS

This application is a continuation of U.S. patent application Ser. No. 17/033,232, filed on Sep. 25, 2020, and entitled "SYSTEMS AND METHODS OF ADAPTIVELY SECURING NETWORK COMMUNICATION CHANNELS", which claims all benefit including priority from U.S. provisional patent application No. 62/905,735, entitled "SYSTEMS AND METHODS OF ADAPTIVELY SECURING NETWORK COMMUNICATION CHANNELS", filed on Sep. 25, 2019, the entire contents of which are hereby incorporated by reference herein.

FIELD

Embodiments of the present disclosure generally relate to the field of network communications, and in particular to systems and methods for monitoring suspicious communication network traffic.

BACKGROUND

Computing devices may be configured to transmit communication messages to other computing devices and receive communication messages from other computing devices via one or more communication networks. In some scenarios, network servers may be configured to monitor communication network traffic. The network servers may be configured to generate or store data records associated with sequences of communication events.

Network communication events among client devices may be logged as a series of data values. In some examples, communication events may be associated with time stamps, destination identifiers (e.g., uniform resource locator (URL), among other examples), content types (e.g., text, image, video, among other examples), or other attributes associated with the event.

SUMMARY

The present disclosure describes systems and methods for monitoring suspicious communication network traffic across a communication network. Client devices may be configured to transmit messages to other client devices and receive messages from other client devices via communication networks. Network servers, such as threat detection servers, may be configured to generate and store data associated with sequences of communication events transmitted over time. Over time, network servers may be configured to identify baseline metrics or patterns associated with features or attributes corresponding to sequences of communication events. For example, a network server may identify a periodic nature among sequences of communication events or baseline patterns associated with database access requests (e.g., popularity of Internet webpage access requests or online banking access requests), among other examples.

In some embodiments, systems may be configured to determine whether a sequence of communication events may have been generated by a computing agent, such as an Internet BOT or a programmatic script, or whether the sequence of communication events may have been generated based on human user input.

Systems and methods disclosed herein may be based on computations of Kolmogorov complexity. As Kolmogorov complexity may not be Turing computable, in some embodiments, systems and methods disclosed herein may be configured to determine entropy approximation associated with sequences of communication events as a proxy for identifying regularity or unpredictability of fluctuations of sequences of communication events over time.

In some embodiments, systems and methods may be configured to encode data associated with sequences of communication events. Encoded data strings may be associated with metadata describing characteristics of sequences of communication events. To identify regularity or deviations from expected patterns among sequences of communication events across communication networks, systems and methods described herein may determine compression ratio or metrics associated with data to identify patterns or deviations from expected patterns.

In some embodiments, systems may be configured to determine whether sequences of communication events generated by a computing agent may be a potential threat to the communication network or to client devices associated with the communication network. The systems may be configured to identify potentially malicious sequences of communication events based on anomaly classification models for classifying said sequences of transmitted communication events. In some embodiments, anomaly classification models may be unsupervised models and may be trained based on data representing prior sequences of communication events. Systems may be configured identify outlier or non-outlier anomaly ranges associated with sequences of communication event.

In some scenarios, it may be beneficial to adaptively interpret anomaly classification model results for identifying potential threats to the communication network. Upon training of an anomaly classification model, some embodiments of systems may be configured to identify a nominal output range (e.g., no perceived network threat), an outlier anomaly range, and a non-outlier anomaly range associated with model outputs. In some embodiments, the non-outlier anomaly range may be defined as between the nominal and the outlier anomaly ranges, and systems may be configured to interpret classification output within the non-outlier anomaly range as being associated with a potential threat to the communication network. Other classification ranges may be contemplated. In some embodiments, systems may be configured to define classification ranges/thresholds based on the rationale that unscrupulous sequences of communication events may be generated to avoid being identified as outlier anomaly data points, but may nonetheless deviate from expected patterns of communication events within communication networks. Other aspects of embodiments of the present disclosure will be described herein.

In one aspect, the present disclosure provides a system that may include: a processor; and a memory coupled to the processor. The memory may store processor-executable instructions that, when executed, configure the processor to: obtain data associated with a sequence of communication events transmitted via the communication network; determine, based on the obtained data, an entropy approximation measure associated with at least one event attribute for the sequence of communication events; generate a threat prediction value based on an anomaly classification model and the entropy approximation measure associated with the sequence of communication events, wherein the anomaly classification model is trained based on prior sequences of communication events to identify a non-outlier anomaly range associated with the at least one event attribute, and wherein the threat prediction value is generated based on classification of the entropy approximation measure relative to the non-outlier anomaly range associated with the at least one attribute for identifying a potential threat; and transmit a signal for communicating that the sequence of communication events is a potential threat within the communication network based on the threat prediction value.

In another aspect, the present disclosure provides a method that may include: obtaining data associated with a sequence of communication events transmitted via the communication network; determining, based on the obtained data, an entropy approximation measure associated with at least one event attribute for the sequence of communication events; generating a threat prediction value based on an anomaly classification model and the entropy approximation measure associated with the sequence of communication events, wherein the anomaly classification model is trained based on prior sequences of communication events to identify a non-outlier anomaly range associated with the at least one event attribute, and wherein the threat prediction value is generated based on classification of the entropy approximation measure relative to the non-outlier anomaly range associated with the at least one attribute for identifying a potential threat; and transmitting a signal for communicating that the sequence of communication events is a potential threat within the communication network based on the threat prediction value.

In another aspect, a non-transitory computer-readable medium or media having stored thereon machine interpretable instructions which, when executed by a processor may cause the processor to perform one or more methods described herein.

In various aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 8 illustrates an extract of a proxy log, in accordance with embodiments of the present disclosure;

FIG. 9 illustrates an extract of a proxy log, in accordance with embodiments of the present disclosure;

DETAILED DESCRIPTION

Figure 1:
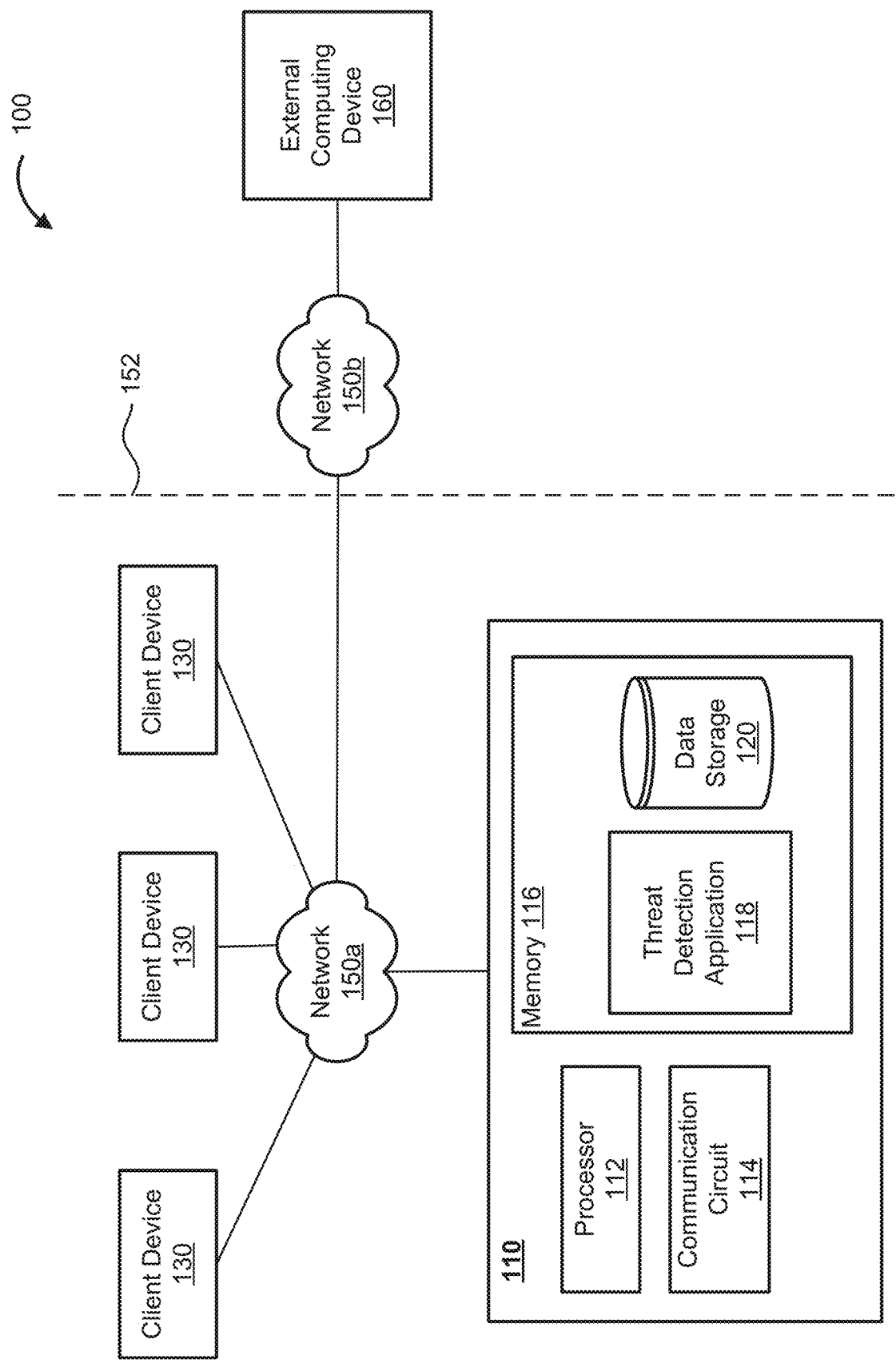
FIG. 1 illustrates a communication system, in accordance with an embodiment of the present disclosure.

Systems and methods for monitoring suspicious communication network traffic are described in the present disclosure. Systems may be configured to detect potential threats within the communication network or to client devices associated with the communication network based on data sets representing sequences of communication events among client devices.

As non-limiting examples, potential network threat events may include command-and-control operations associated malware beaconing. A network firewall may be a system that monitors and controls, based on security rules, communication events between computing devices "internal" to the firewall and "external" to the firewall. Malware beaconing operations for the purpose of circumventing a network firewall may include communication messages between (i) a computing device external to a protected communication network; and (ii) a computing device authorized to communicate across the protected communication network. Because the network firewall may be a barrier to an unscrupulous user associated with a computing device external to the protected communication network, in some scenarios the unscrupulous user may employ deceptive tactics to have malware installed on computing devices authorized to communicate across the protected communication network. The computing devices having the malware installed may then be configured to transmit communication messages to a command-and-control server associated with the unscrupulous user on a periodic basis, thereby circumventing the network firewall. In some examples, malware may include programmatic scripts for initiating communication messages. As particular sequences of communication events generated by malware may be unexpected or uncharacteristic of a protected communication network, detection of such sequences of communication events may assist with deducing potential threats to the communication network.

In another example, network threat events may include events that deviate from expected sequences of communication events generated by computing devices associated with Service Accounts. To illustrate, unscrupulous users may employ tactics to take control of computing devices associated with Service Accounts. Because Service Accounts may have access permissions to one or more computing devices within a protected communication network (e.g., configured with administrator account credentials for conducting software maintenance activity or the like on target client devices), unscrupulous users may attempt deceptive tactics to have malware installed on computing devices associated with Service Accounts. As computing devices associated with Service Accounts may generate communication events on a predefined and periodic basis (e.g., known characteristics/behavior), detected changes to expected and periodic patterns of communication events may assist with deducing potential threats to the protected communication network.

In another example, network threat events may include operations for guessing login credentials (e.g., passwords or the like). Login credential guessing operations may include operations based on brute-force or systematic computing operations. In some embodiments, systems may be configured to detect unscrupulous password guessing operations associated with gaining access to databases or accounts, such as online banking accounts associated with banking institutions, e-commerce shopping websites associated with merchants/retailers, or the like.

In another example, network threat events may include operations for gaining unauthorized access to user accounts for conducting a series of nominal sized resource transfers to another account (e.g., unauthorized series of modest sized currency transfers from a compromised user account to an unscrupulous user's account). Unscrupulous users may conduct operations to systematically transfer modest sized currency amounts to avoid detection of large value transfers. Systematic transfer operations may be periodically timed or may have other programmatic characteristics. As a communication network may be characterized with expectations of communication event sequences, detection of changes to series of communication events (e.g., series of numerous transactions) may assist with deducing potential threats to the protected communication network. In some embodiments, systems described herein may be configured to detect potentially unauthorized or recurring transactions for the purpose of avoiding detection of large currency transfers to the unscrupulous user's banking account.

In some scenarios, operations for compromising access to computing networks (e.g., malware beaconing), to computing devices (e.g., unauthorized use of Service Accounts), or to user accounts (e.g., password guessing or unauthorized series of communication messages) may be executed by computing agents. Computing agents may include Internet BOTs, computing devices conducting programmatic scripts, or other types of similar devices for automating tedious or complex tasks. As operations conducted by computing agents may be based programmatic operations having pseudo deterministic characteristics, it may be beneficial to provide systems and methods for detecting network threat events based on data sets representing sequences of communication events transmitted among two or more client devices.

Systems and methods described in the present disclosure may distinguish communication events generated by computing agents from communication events generated based on human user input, thereby deducing potential threats to the communication network or client devices associated with the communication network.

In some embodiments, systems may be configured to determine entropy approximation measures associated with sequences of communication events to quantify the amount of regularity or unpredictability of fluctuations of communication events over time. By determining entropy approximation measures of a sequence of communication events occurring over time, systems and methods described herein may utilize entropy approximation measures as a proxy for identifying changes to previously observed patterns in sequences of communication events, thereby identifying potential threats to the communication network.

Reference is made to FIG. 1, which illustrates a communication system 100, in accordance with an embodiment of the present disclosure. The communication system 100 may include one or more computing devices, such as a threat detection server 110 and one or more client devices 130 in communication, via a protected network 150a, with the threat detection server 110.

The communication system 100 may include an external computing device 160 configured to transmit or receive messages, via an external network 150b and a network firewall 152, to or from one or more client devices 130. The network firewall 152 may be a network security system that monitors or controls incoming/outgoing network traffic based on predefined network security rules. In some embodiments, the network firewall 152 may establish a network "barrier" between the protected network 150a and the external network 150b.

In some embodiments, the threat detection server 110 may include features of a proxy server or any other server device for monitoring communication events, or generating or storing network traffic logs of communication events among any one of the client devices 130 or the external computing device 160. Three client devices 130, a sole threat detection server 110 and a sole external computing device 160 are illustrated in FIG. 1; however, it may be understood that any number of client devices, external computing devices, or threat detection servers arranged in other configurations may be contemplated.

As a non-limiting example, the threat detection server 110 may be a network communication monitoring device or a proxy server for logging details of transmitted communication messages among computing devices. The threat detection server 110 may log details of communication events occurring within the protected network 150a and/or occurring via the network firewall 152.

In some embodiments, the threat detection server 110 may generate or store proxy or network communication logs. The network communication logs may be data representing communication events among the one or more client devices and external computing devices. In some examples, the network communication logs may include metadata representing the communication events. In some examples, communication messages transmitted to a destination device may be associated with a source address, a destination address, a network port number, or a protocol type. For instance, a client device 130 transmitting communication messages for accessing an Internet website (e.g., RBC.com) may be associated with encoded data including: <source address, destination address, port 443, https>. The encoded data set may include attributes such as bytes sent/received, time stamps, uniform resource locator (URL) requested, security action imposed (e.g., allow or block), content type requested (e.g., image, text, video, etc.), or the like. The threat detection server 110 or any other device may conduct operations to identify unexpected communication messaging trends that may indicate potential network security concerns.

The networks (150a, 150b) may include wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated. In some embodiments, the networks (150a, 150b) may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks. Although the protected network 150a and the external network 150b are illustrated in FIG. 1 as separate networks, in some embodiments, the networks may be a single network and the network firewall 152 may conduct operations for routing incoming or outgoing communication messages according to predefined security rules.

The threat detection server 110 includes a processor 112 configured to implement processor-readable instructions that, when executed, configure the processor 112 to conduct operations described herein. For example, the threat detection server 110 may be configured to conduct operations associated with identifying whether a sequence of communication messages or events may have been generated by a computing agent (e.g., BOT, programmatic script, etc.) or a non-computing agent (e.g., computing device generating communication messages based on received user input). In some embodiments, the threat detection server 110 may be configured to conduct operations for detecting whether computing agent generated communication events may be suspicious/a potential threat to network security. In some embodiments, the threat detection server 110 may be configured to conduct operations based on machine learning architectures or models, such as anomaly detection models.

The processor 112 may be a microprocessor or microcontroller, a digital signal processing processor, an integrated circuit, a field programmable gate array, a reconfigurable processor, or combinations thereof.

The threat detection server 110 includes a communication circuit 114 configured to transmit or receive data messages to or from other computing devices, to access or connect to network resources, or to perform other computing applications by connecting to a network (or multiple networks) capable of carrying data.

In some examples, the communication circuit 114 may include one or more busses, interconnects, wires, circuits, or other types of communication circuits. The communication circuit 114 may provide an interface for communicating data between components of a single device or circuit.

The threat detection server 110 includes memory 116. The memory 116 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. In some embodiments, the memory 116 may be storage media, such as hard disk drives, solid state drives, optical drives, or other types of memory.

The memory 116 may store a threat detection application 118 including processor-readable instructions for conducting operations described herein. In some examples, the threat detection application 118 may include operations for identifying anomalous or potentially malicious communication events based on approximate entropy values associated with data representing sequences of communication events. Other operations for detecting network threat events may be contemplated.

The threat detection server 110 includes a data storage 120. In some embodiments, the data storage 120 may be a secure data storage. In some embodiments, the data storage 120 may include data associated with communication events among two or more client devices 130 or external computing devices 160. The data storage 120 may include copies of actual transmitted messages, metadata associated with the transmitted messages, data sets associated with machine learning architecture or anomaly detection models, or other data sets associated with operations described herein.

The client devices 130 or the external computing devices 160 may be computing devices, such as mobile smartphone devices, tablet devices, personal computer devices, or thin-client devices. Communication events among the computing devices via the networks 150 may be logged by the threat detection server 110. The computing devices may include a processor, a memory, or a communication circuit similar to the example processor, memory, or communication circuits of the threat detection server 110.

The threat detection server 110 may be configured to detect network threat events, such as malware beaconing communication events or communication events associated with compromised Service Accounts.

As a non-limiting illustrating example, referring to FIG. 1, a network firewall 152 may be configured to restrict transmission of communication messages from the external computing device 160 (external to the protected network 150a) to one or more client devices 130 (within the protected network 150a). Because the network firewall 152 may restrict communication events from the external computing device 160 to one or more client devices 130 associated with the protected network 150a, an unscrupulous user may, via deceptive techniques such as transmitting emails with links to malware installation files, etc., attempt to deceive a user of the one or more client devices 130 into installing malware onto the one or more client devices 130. As the one or more client devices 130 may have network access permissions to transmit/receive communication messages via the protected network 150, the unscrupulous user may, via operations of the malware software, conduct one or more series of communication events using the client devices 130 as a proxy. For instance, once malware is installed on the one or more client devices 130, the unscrupulous user associated with the external computing device 160 may configure command-and-control operations associated with malware beaconing via the network firewall 152.

In the present example, malware installed on the one or more client devices 130 "inside" the network firewall 152 may be configured to execute, as a background software process, on a periodic basis command-and-control operations to transmit messages to programmed destination addresses or devices (e.g., the external computing device 160 or other device). By circumventing security access protocols of the network firewall 152 or the protected network 150a, an unscrupulous user may gain access to the protected network 150a.

In some scenarios, as command-and-control operations associated with malware beaconing may be generated by computing agents, such as BOTs, programmatic scripts, or software programs that may generate sequences of communication events having detectable communication event characteristics, it may be desirable to provide systems and methods of adaptively deducing whether the communication network may be compromised by malware beaconing communications. As will be described, detection of communication messages that may have unexpected characteristics or that may be unexpectedly period/repetitive may be beneficial to deducing threats to communication networks.

As another non-limiting illustrating example, the external computing device 160 may be associated with a Service Account, thereby being configured to administer applications or maintenance operations at one or more destination devices associated with the protected network 150a. For instance, the external computing device 160 may be associated with a software vendor for administering security or software maintenance/updates at destination devices, such as the one or more client devices 130. In the present example, the external computing device 160 (configured as a Service Account) may be configured to initiate communication events with the one or more client devices 130 (configured as destination devices) on a periodic basis or on the basis of other defined communication event cadence. Because the external computing device 160 may be configured as a Service Account having access credentials to configure or modify the one or more client devices 130, unscrupulous users may compromise the external computing device 160, thereby gaining potential access, via login credentials associated with the Service Account, to the one or more client devices 130.

As communication events associated with Service Accounts may be computing agents, such as BOTs, programmatic scripts, or software programs that may generate sequences of communication events over time having detectable communication event characteristics, it may be desirable to provide systems and methods of adaptively deducing, based on monitoring a sequence of communication events transmitted via the communication network, whether the external computing device 130 of the present example may have been compromised. In some examples, threat detection server 110 may detect changes to communication events that are expected to be periodic or expected to have defined characteristics (e.g., repetitive or deterministic in nature) for deducing a potential network or computing device breaches.

In some embodiments, systems and methods of deducing compromised computing devices based on monitoring sequences of communication events may be based on analysis of proxy logs or communication message logs representing the sequences of communication events. Systems may be configured to generate models based on machine learning architecture for determining baseline or predefined expectations for sequences of messages being transmitted/received by client devices 130 associated with a protected network 150a.

Figure 2:
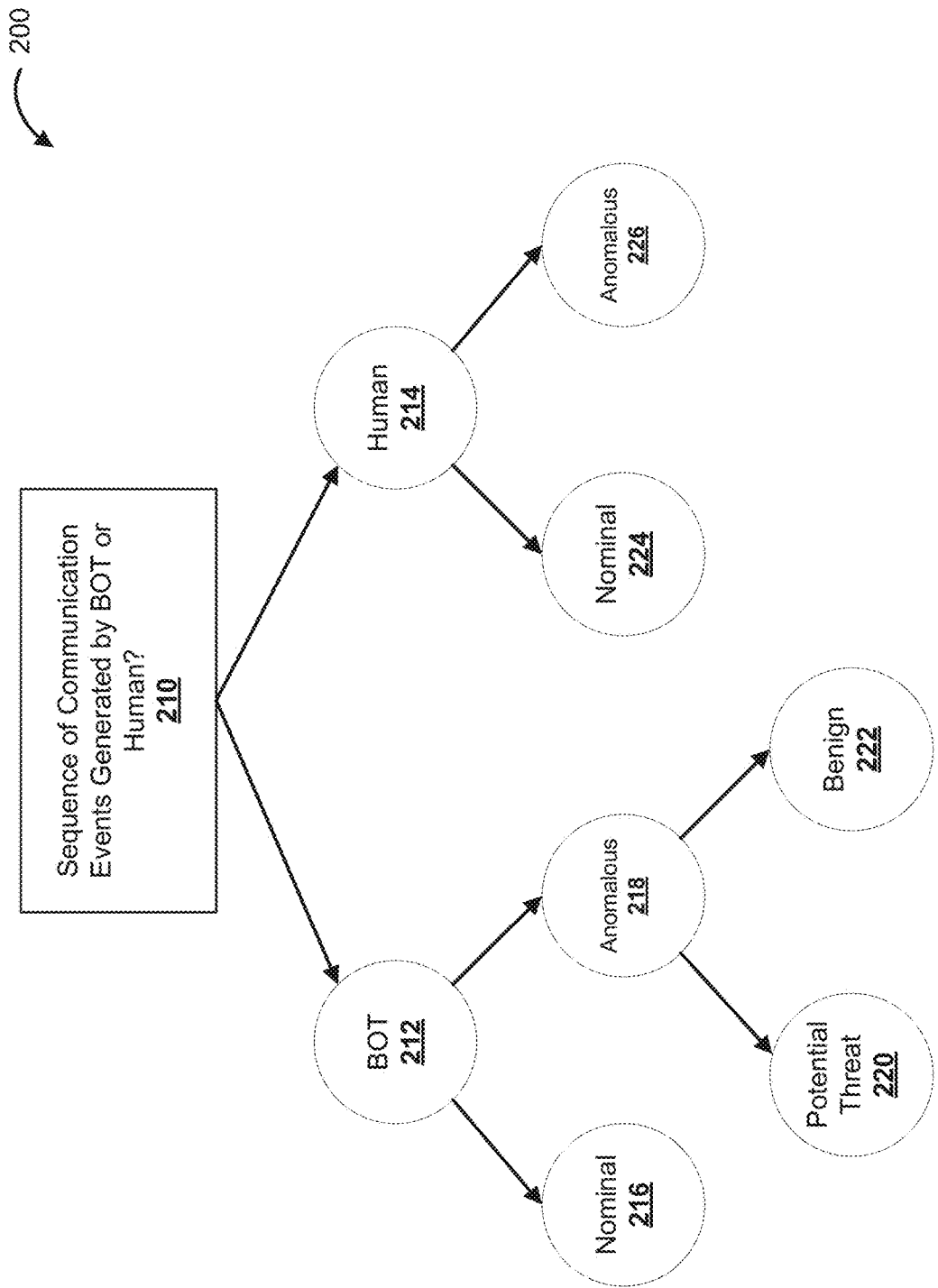
FIG. 2 illustrates a tree diagram illustrating classification categories that may be assigned to sequences of communication events, in accordance with embodiments of the present disclosure.

Reference is made to FIG. 2, which illustrates a tree diagram 200 for illustrating classification categories that may be assigned to sequences of communication events, in accordance with embodiments of the present disclosure.

The threat detection server 110 (FIG. 1) may be configured to obtaining data associated with a sequence of communication network events transmitted between at least two client devices over time. In some embodiments, the data associated with a sequence of communication network events may be an encoded data set or may be metadata describing characteristics of the sequence of communication events. As an example, for a sequence of communication messages sent from a source device to a destination device, successive messages may be respectively sent 1 minute, 4 minutes, 5 minutes, 2 minutes, and 7 minutes apart. Accordingly, an encoded data set representing that sequence of network communication events may be "1&4&5&2&7". The ampersand (&) may be a padding value and can be any other character.

Based on the obtained data associated with the sequence of communication network devices, the threat detection server 110 may conduct operations for deducing whether said sequence of communication network events may have been generated by a computing agent 212 (e.g., a BOT) or a human user 214 providing input at a client device. A sequence of communication events that may be identified as generated based on input of a human user 214 may further be categorized as nominal 224 communication events or anomalous 226 communication events.

For example, a sequence of communication events may be associated with a user logging into an Online Banking Account of a banking institution. When successive incorrect login credentials may be received at random times (e.g., without any apparent periodicity), the threat detection server 110 may identify the sequence of communication events as being generated by human user 214 input. That is, the threat detection server 110 may identify the successive incorrect login credentials as being nominal 224 or not a threat if characteristics of the sequence of communication events do not meet a predetermined threshold.

In contrast, when successive incorrect password entries differ by a single incrementing character, the threat detection server 110 may deduce that the successive incorrect login credentials as anomalous 226. Other predefined or combinations of characteristics or rules for identifying whether a sequence of human generated communication events may be a potential threat may be contemplated.

The present disclosure discloses operations of the threat detection server 110 for detecting network threat events based on sequences of communication events generated by computing agents 212 (e.g., BOTs).

In some embodiments, the threat detection server 110 may deduce whether sequences of communication events are generated by a computing agent 212 or human user input. For example, the threat detection server 110 may deduce that a sequence of communication events may have been generated by a computing agent based on statistical entropy approximations associated with one or more explainable features or attributes of the sequence of communication events. In some examples, determining that the sequence of communication events is generated by a computing agent may be based on principles of Kolmogorov complexity.

The Kolmogorov complexity of an object may be associated with a size of a shortest program that may generate that object. Sequences of communication events associated with a defined or periodic pattern may be associated with a smaller detected Kolmogorov complexity, thereby implying that the sequence of communication events may have been generated by a computing agent 212 via a programmatic script or other software program.

In comparison, sequences of communication events associated with a less periodic or with less defined patterns may be associated with a larger detected Kolmogorov complexity, thereby implying that the sequence of communication events may have been generated based on human user input. Example methods for detecting whether a sequence of communication events may have been generated by a computing agent 212 or based on human user input 214 are disclosed herein.

In some scenarios, communication events generated by computing agents 212 may not necessarily be anomalous events or potential network threats. For instance, computing agents 212 may be configured to generate a large quantity of communication events for maintenance operations (e.g., software update operations) or network status operations (e.g., managing quantity of network users or network bandwidth), among other examples. It may be beneficial to provide systems and methods for deducing whether communication events generated by computing agents 212 may be nominal 216 (e.g., expected sequences of communication events) or anomalous 218.

In some embodiments, the thread detection server 110 may be configured to identify whether communication events identified as being generated by computing agents 212 and being anomalous may be: (i) a potential threat 220 to the subject communication network; or (ii) benign communication event.

Figure 3:
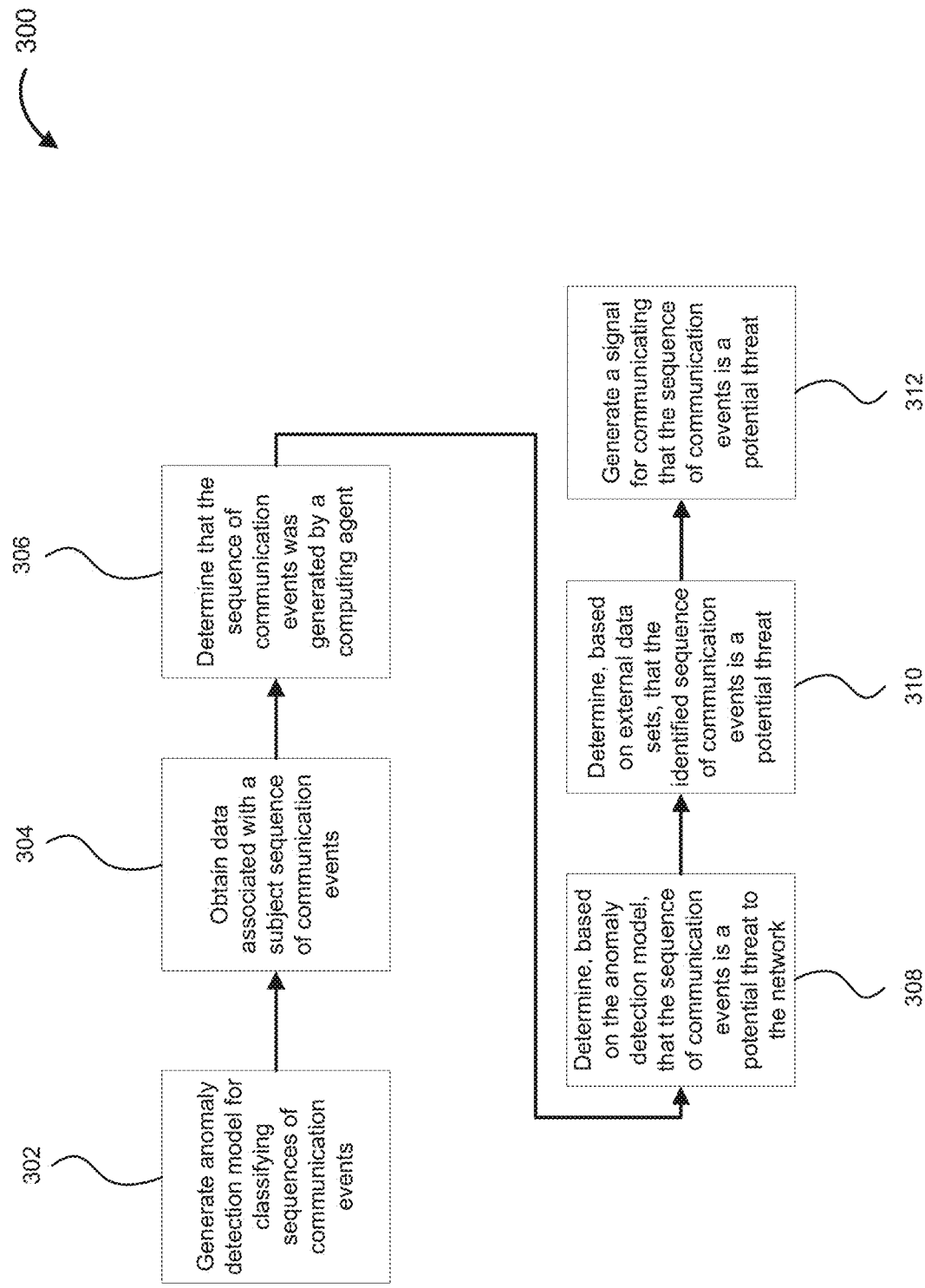
FIG. 3 illustrates a flowchart of a method of detecting potential network threat events associated with sequences of communication events, in accordance with embodiments of the present disclosure.

Reference is made to FIG. 3, which illustrates a flowchart illustrating a method 300 of detecting potential network threat events associated with sequences of communication events, in accordance with embodiments of the present disclosure. One or more of the computing devices illustrated in FIG. 1 may conduct operations of the method 300. For example, the threat detection application 118 (FIG. 1) may include instructions that, when executed, configure a processor to conduct the operations of the method 300.

The threat detection server 110 may be configured to generate and store network traffic logs representing sequences of communication events. The sequences of communication events may include communication messages sent among one or more client devices 130 within the protected network 150a (illustrated in FIG. 1) or among one or more client devices 130 and external computing devices 160 via the network firewall 152 (illustrated in FIG. 1). In some embodiments, the threat detection server 110 may be configured to generate encoded data sets representing the sequences of communication events. The encoded data sets may be associated with metadata for summarizing characteristic features of the sequences of communication events. For example, the encoded data sets may represent periodicity of sequences of communication events or may represent other data for generating predefined expectations of what typical sequences of communication events may be observed within the protected network 150a.

In some scenarios, it may be expected that computing agents generate a large percentage of legitimate or expected communication events for transmission via networks (150a, 150b). Legitimate or expected communication events may include communication events for software updates, maintenance, among other examples. In some examples, client devices 130 may generate periodic communication events such as status update messages or network "heartbeat" message, among other examples.

To extract explainable features associated with sequences of communication events regarded as nominal or routine, the threat detection server 110 at operation 302 may generate anomaly classification models for classifying sequences of communication events. The threat detection server 110 may generate unsupervised anomaly classification models based on a plurality of prior logs associated with sequences of communication events among client devices of the protected network 150a, the external network 150b, or any other network.

In some embodiments, the unsupervised anomaly detection models may include isolation forest model operations. Periodically, the threat detection server 110 may obtain data associated with sequences of communication events (e.g., on-going basis) as input for the unsupervised anomaly detection models, and the threat detection server 110 may generate thresholds or communication event characteristics that may be regarded as "expected" or "how things should be" for communication events occurring via the networks (150a, 150b).

The threat detection server 110 may determine there to be an expected quantity of BOT-generated communication events for software maintenance operations, or that there may be an expected quantity of communication events associated with a website destination address. In some examples, the anomaly detection models may be based on explainable attributes or features such as upload data size per unit time, download data size per unit time, quantity of communication events per unit time, population of destination addresses for communication events, among other examples. Such anomaly detection models may be used to detect sequences of communication events that may deviate from baseline expectations. By identifying sources of sequences of communication events that deviate from baseline expectations, the threat detection server 110 may identify potential computing agents that generate communication events posing a threat to the protected network 150a or client devices associated with the protected network 150a.

In some embodiments, the threat detection server 110 may adaptively update generated thresholds or expected event characteristics over time. As new data representing sequences of communication events may be obtained, anomaly classification models may be trained to identify outlier metrics or non-outlier anomaly metrics. Accordingly, the threat detection server 110 may dynamically generate anomaly classification models over time for identifying potential communication event threats to the protected network 150a or to client devices 130 associated with the protected network 150a.

At operation 304, the threat detection server 110 may obtain data representing a sequence of communication events. The threat detection server 110 may obtain the data representing the sequence for generating a threat prediction result. In some examples, the data may be based on proxy logs, and the proxy logs may include a series of time stamps respectively associated with one of the sequence of communication events. To deduce potential threat events, the threat detection server 110 may conduct operations to detect: (a) changes in an expected pattern of communication events; or (b) unexpected emergence of a pattern of communication events.

In some embodiments, the data representing the sequence of communication events may include encoded data values. For example, upon obtaining the data representing the sequence of communication events, the threat detection server 110 may compute time differences between successive or adjacent time stamp values, and may generate a string storing a series of time differences between successive time stamps of a sequence of communication events. For example, if successive communication events are sent 1, 4, 5, 2, and 7 minutes apart, the generated relation string may be "1&4&5&2&7". The ampersand (&) may be a padding value. In some other examples, the string may not include any padding values.

Other types of encoded data values or strings associated with other characteristics of successive communication events may be contemplated. For example, the threat detection server 110 may generate encoded data values or strings associated with other features, such as URLs accessed, times of requests, content types requested, among other examples.

At operation 306, the threat detection server 110 may determine whether the sequence of communication events was generated by a computing agent 212 (FIG. 2) or generated based on human user 214 input. For instance, the threat detection server 110 may determine that the sequence of communication events associated with the obtained data was generated by a computing agent 212. Computing agents 212 may include Internet BOTs, computing devices executing programmatic scripts, or other software for automating tedious or complex tasks.

In some embodiments, operations for differentiating communication events as being generated by computing agents 212 from those generated based on human user input may be based on approximating statistical entropy approximations associated with features or attributes of sequences of communication events.

In some embodiments, statistical entropy may be based on approximating Kolmogorov complexity of the sequences of communication events. The Kolmogorov complexity of an object may be defined as the size of the shortest program that can generate that object. In some scenarios, for a given sequence of communication events, a smaller associated Kolmogorov complexity may imply that the sequence of communication events was generated by programmatic means. A larger associated Kolmogorov complexity may imply that sequence of communication events was generated based on human user input. Other operations for determining whether a sequence of communication events was generated by a computing agent 212 or generated based on human user 214 input may be contemplated. In some other embodiments, the relation between Kolmogorov complexity associated with a sequence of communication events and a determination of whether the sequence was generated by a BOT or human user input may be reversed and dependent on what the threat detection server 110 may identify as expected or predefined communication event patters of the communication networks.

In some embodiments, the threat detection server 110 may categorize a sequence of communication events as BOT generated or generated by human user input based on determining approximate entropy and Kolmogorov complexity of sequences of communication events. In some examples, the threat detection server 110 may compute approximate entropy of a sequence of communication events. In some scenarios, up until a threshold point, Kolmogorov complexity may increase with increasing entropy and, subsequently, the Kolmogorov complexity may begin decreasing.

For instance, a single line of Python software code may generate random numbers, where the random numbers may have relatively high approximate entropy and small Kolmogorov complexity. In another instance, a single line of Python software code may generate a sequence of 11111111 . . . , where the sequence of ones may have minimal (relatively low) approximate entropy with small Kolmogorov complexity.

In another example, a data string "010101010101010101010101010101" may be generated by a programmatic script by repeatedly printing the string "01" fifteen times. In contrast, a relation string "011010110101101011010111101000" may not be associated with a redundant pattern and the length of the shortest computer program to produce the string output may be to print the actual data string: "011010110101101011010111101000". Accordingly, the latter data string output may be regarded as having a greater Kolmogorov complexity than the former data string output.

Thus in some examples, the threat detection server 110 may utilize principles of Kolmogorov complexity as a proxy for classifying whether a sequence of communication events may have been generated by a computing agent or whether the sequence of communication events may have been generated based on human user input.

In examples where entropy approximation may be used as a proxy for estimating Kolmogorov complexity, prior domain knowledge may assist with deducing that sequences of communication events associated with higher and lower regions across an approximate entropy spectrum are more likely to be generated by computing agents 212 (FIG. 2). In the present example, sequences of communication events associated with a "middle" region of an approximate entropy spectrum may be more likely to be based on human user input. Statistical approximate entropy may be used to quantify an amount of regularity or unpredictability of fluctuations over a sequence of communication events over time, where a sequence of communication events over time may be represented as time-series data.

In embodiments of the present disclosure, the threat detection server 110 may classify communication events based on population statistics and prior knowledge that approximately half of communication events may be expected to be generated based on computing agents. The threat detection server 100 may thereby provide an unsupervised classification model for identifying sequences of communication events generated based on human user input and sequences of communication events generated by computing agents.

In some embodiments, Kolmogorov approximation may be based on compression analysis of data associated with the sequence of communication events. As an example, the threat detection server 110 may compress data associated with the sequence of communication events and, based on the compressed data, generate a compression metric. Operations to compress data may be based on identifying data value redundancy in a string of characters, Based on the identified data redundancy, operations may be configured to generate a more efficient representation of the data. A compression metric may be a measurement of a relative reduction in size of a data representation produced by a data compression algorithm.

In some scenarios, a detected change in compression metric for sequences of communication events over time may indicate that a pattern of communication events may have changed. In some scenarios, the change in pattern of communication events may suggest presence of unscrupulously initiated communication events. Examples of unscrupulously initiated communication events may include malware beaconing operations, login credential guessing operations, or compromised Service Account operations, among other examples.

To illustrate, the threat detection server 110 may be configured to generate a compression metric for a data string representing time difference between a sequence of communication events:

Data String 1: "30&30&30&30&30&30&30&30&30&30&30&30&30&30&30"
Data String 2: "30&30&30&30&30&30&20&2&2&6&30&30&30&30&30"

The processor may conduct operations based on the following pseudo code:
>>>string1_time_compressed=zlib.compress(string1)
>>>string2_time_compressed=zlib.compress(string2)
>>>compress_ratio_string1=float(len (string1_time_compressed))/len(string1)
>>>compress_ratio_string2=float(len (string2_time_compressed))/len(string2)

For the respective data strings, the processor may calculate a length of the string and a length of a compressed version of the string. Further, the processor may calculate a ratio of: (a) length of the original string; and (b) length of the compressed string. In the above-described example, a determined compression metric for "Data String 1" may be 0.31 and a determined compression metric for "Data String 2" may be 0.5.

"Data String 1" may represent an expected sequences of communication events between one or more client devices 130 (FIG. 1). For example, the expected sequence of communication events may include periodic status messages communicated from one client device to another client device at fixed time intervals (e.g., operation by a Service Account servicing a destination client device). "Data String 1" may represent communication messages being transmitted every 30 seconds.

"Data String 2" may represent an example sequence of communication events between the same above-described client devices that deviates from an expected sequence of communication events. "Data String 2" may represent several communication messages that may not conform to an expected pattern of communication messages being transmitted every 30 seconds. The deviation in the expected pattern of communication events may cause a change in the compression metric for "Data String 2".

The change in compression metric over time may indicate that a pattern of communication of events may have changed. The threat detection server 110 may conduct operations to deduce that the change in pattern may be suggestive of an unscrupulous user initiating communication events associated with malware beaconing, password guessing, compromising a Service Account, or other operations that may be considered a threat to the protected network 150a (FIG. 1).

At operation 308, the threat detections server 110 may determine whether the sequence of communication events (determined to have been generated by a computing agent) is a potential threat to the protected network 150a. Continuing with the above-described example, "Data String 1" may represent an example sequence of communication events generated by a Service Account, which may be an expected pattern of repetitive communication events. "Data String 2" may represent a deviation in the expected pattern of repetitive communication events, which may be caused by an unscrupulous user accessing a computing device associated with the Service Account and causing the sequence of communication events to deviate from an expected pattern. Thus in some embodiments, a change in detected compression metric beyond a threshold level may be a proxy for deducing a disruption of expected sequence of communication events.

In some embodiments, operations disclosed herein may be configured to account for time intervals susceptible to jitter. In some embodiments, sample jittered time intervals may be prepared to cover jitter levels from 0 to 100%. In some scenarios, the compression success for jittered time intervals may be prerecorded and compared to sequences of communication events under analysis. In an example, a compression analysis associated with 50% jitter may be selected as a threshold for differentiating between human user input generated communication events and computer agent generated communication events (e.g., resulting in a 50%-50% division between BOT and human user input generated communication events).

Although examples described herein may relate to encoded data values associated with time stamps of sequences of respective communication events, in some embodiments, encoded data values may be based on two or more attributes/features of sequences of communication events. Attributes or features may include a size of communication event packets, time stamps, among other examples of features of communication events. In some embodiments, the threat detection server 110 may determine whether there has been a change or unexpected emergence of a pattern based on encoded values representing two or more attributes (e.g., size of communication event packets and time stamps) of sequences of communication events.

In some embodiments, the anomaly detection model generated at operation 302 may be an unsupervised anomaly detection model, such as an isolation forest model. An isolation forest may be an unsupervised learning model for anomaly detection for identifying outlier data points. In some examples, the threat detection server 110 may provide, as input, data associated with a sequence of communication events that was identified as being generated by a computing agent to the anomaly detection model. Based on the anomaly detection model, the threat detection server 110 may provide a quantified output between 0 and 1 for indicating whether the inputted sequence of communication events represents anomalous outlier events. In some examples, when the threat detection server 110 determines that the inputted sequence of communication events deviates from a "base line" range, the threat detection server 110 may determine that the inputted sequence of communication events may be a potential threat to the protected network 150a or client devices associated with the protected network 150a.

In some embodiments, the anomaly detection model generated at operation 302 may define a quantified output ranges to be indicative of non-malicious, non-ill intended, or non-threating sequences of communication events. For example, the threat detection server 110 may conduct learning operations based on a plurality of prior logs associated with sequences of communication events among client devices of the protected network 150a to define the quantified output ranges of 0 to 0.5 and 0.7 to 1, such that sequences of communication events classified with outputs within the above-described ranges may be classified as at least one of non-malicious, non-ill intended, or non-threatening sequences of communication events. In the above-described example, the threat detection server 110 may conduct learning operations and define classification thresholds based on the rationale that unscrupulous users may not wish to develop computing agents for generating communication events that may be identified as extreme outliers (e.g., malware programmatic scripts generating large quantities of unexpected data uploads).

Based on the above, some embodiments of the threat detection server 110 may be configured to generate anomaly detection models defining classification thresholds to identify: (i) sequences of communication events within learned predefined thresholds as being non-threatening communication events; and (ii) sequences of communication events that are extreme outliers as being non-threatening communication events. Such classification thresholds may be based on learning operations by unsupervised anomaly detection models using prior logs associated with sequences of communication events among client devices operating within a protected network 150a. The learned classification thresholds for identifying non-threatening communication events may be dynamically determined over time and may represent attributable characteristics of client devices communicating via the protected network 150a.

Further, embodiments of the threat detection server 110 may be configured to generate the anomaly detection models to define a non-outlier anomaly classification threshold range for identifying potentially threatening sequences of communication events. Continuing with the above-described example, the non-outlier anomaly classification threshold range may be greater than a determined nominal output range, but less than an outlier anomaly range.

In the above-described examples, the anomaly detection model may be based on unsupervised anomaly models, such as isolation forests, among other examples. Unsupervised anomaly detection models may not utilize predefined labels, thereby reducing bias when determining anomalous outlier data points.

In some other embodiments, the threat detection server 110 may generate supervised anomaly detection models. As a non-limiting example, supervised anomaly detection models may be based on Bayesian-based networks that may be configured with imputed prior domain knowledge. It may be appreciated that embodiments for generating supervised anomaly detection models may be based on prior assumptions associated with attributes or features of the protected network 150*a* and client devices 130 associated with the protected network 150*a*.

At operation 310, the threat detection server 110 may determine based on external data sets that the identified sequence of communication events is likely a potential threat to the protected network 150*a*. In some embodiments, the external data sets may be based on third-party anomaly detection models, thereby providing a pseudo-independent validation that what has been identified by the threat detection server 110 as potentially threatening communication events may also be identified by other data sources as potentially threatening communication events. For example, external data sets may be associated with crowd-sourced data points classifying sequences of communication events as having characteristics/features/attributes of potentially ill-intended operations. Other examples of external data sets may be contemplated.

At operation 312, the threat detection server 110 may generate a signal for communicating that the subject sequence of communication events is a potential threat to the protected network 150*a* or one or more client devices 130 associated with the protected network 150*a*. In some embodiments, the signal may be associated with a halt message for display at a user interface of the threat detection server 110 or another client device associated with an administrator user. In some embodiments, the signal may be associated with an operation to conduct a security action to prevent further sequences of communication events among identified client devices associated with the identified threat.

In some embodiments, the threat detection server 110 may a determine statistical entropy approximation associated with data representing sequences of communication events. Entropy approximations may be computed as a proxy for determining whether patterns of the sequence of communication events deviate from expectations of communication events within a communication network. Expectations of communication events within a communication network may be based on one or more attributes associated with sequences of communication events.

For example, an attribute associated with sequences of communication events may include time between successive communication events (e.g., regular cadence of communication event transmissions across the communication network), data upload rate or data download rate, size of communication event messages, among other examples.

Embodiments of the present disclosure include systems for generating threat predictions based on anomaly classification models and determined entropy approximations by determining whether determined entropy approximations may be classified in one or more anomaly ranges associated with potential threat events. In some examples, entropy approximations may include data set compression metrics.

Figure 4:
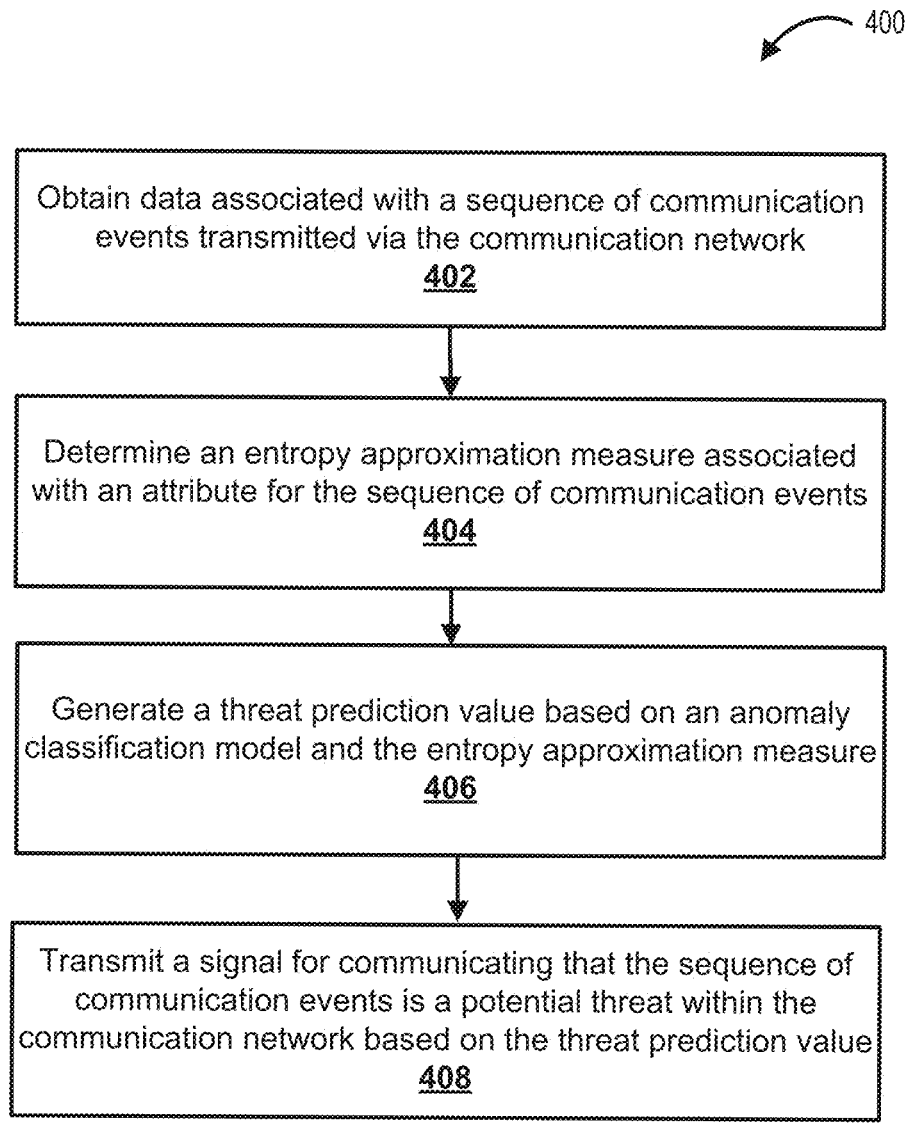
FIG. 4 illustrates a flowchart of a method for monitoring suspicious communication network traffic, in accordance with embodiments of the present disclosure.

To illustrate, reference is made to FIG. 4, which illustrates a flowchart of a method 400 for monitoring suspicious communication network traffic, in accordance with embodiments of the present disclosure. The method 400 may be conducted by the processor 112 of the system 110 (FIG. 1). Processor-executable instructions may be stored in the memory 116 and may be associated with the threat detection application 118 or other processor-executable applications not illustrated in FIG. 1. The method 400 may include operations such as data retrievals, data manipulations, data storage, or other operations, and may include computer-executable operations.

At operation 402, the processor may obtain data associated with a sequence of communication events transmitted via the communication network. The processor may obtain data from the memory 116 or the data store 120 of the threat detection server 110 (FIG. 1). In some embodiments, the processor may obtain data from client devices 130 or computing devices associated with the network firewall 152.

The obtained data may include data records for recording details of communication events among client devices of the communication network. For example, the data records may include data associated with device or destination addresses (e.g., uniform resource locators requested), time stamps, bytes sent/received, action conducted by the network firewall (e.g., communication event blocked or allowed), content type requested (e.g., image, text, etc.), among other examples.

In some embodiments, the data associated with the sequence of communication events may include encoded data values. To illustrate, encoded data values may include data strings representing a series of time differences between communication events, such as time differences between accesses to a particular webpage destination address. An example of partial data records are illustrated below:

--- tracker.leadexpress.nl
Diff Between Access Times: [12, 10, 10, 10, 10, 10, 10, 10, 10, 10, 10, 10, 10, 1616, 11]
Compression Ratio: 0.962962985039
mississaugaringette.com
Diff Between Access Times: [7292, 1816, 1809, 1816, 1803, 1804, 1801, 1815, 1810, 1816, 1817, 1804, 1803, 1818, 57756]
Compression Ratio: 0.971428573132
power.iphone4.tw
Diff Between Access Times: [305, 307, 27, 304, 208, 304, 303, 303, 303, 302, 111]
Compression Ratio: 1.05172419548

---

The above illustrated data records include destination device addresses, associated time differences between time stamps of sequential communication events, and determined compression ratios of the stored time differences. Data records storing other attributes of communication events may be contemplated.

In some embodiments, data records or data sets representing prior sequences of communication events may be used for training anomaly classification models. Data sets representing prior sequences of communication events may be stored in the data storage 120 of the threat detection server 110. In some embodiments, the threat detection server 110 may train anomaly classification models such that the threat detection server 110 may determine whether future sequences of communications may be a potential threat within the communication network.

At operation 404, the processor determines, based on the obtained data, an entropy approximation measure associated with at least one event attribute for the sequence of communication events. For example, the event attribute may include time differences between respective communication events.

In some embodiments, the sequence of communication events may be associated with a time-series data set. The processor may determine an entropy approximation measure for quantifying an amount of regularity or unpredictable fluctuations over the time-series data set. In some embodiments, the entropy approximation measure may be a proxy for determining whether a subject sequence of communication events may be deviating from an expected pattern of communication events within the communication network.

In some embodiments, the entropy approximation measure may include a compression metric based on a compression ratio of the data associated with the sequence of communication events. In the above example, the compression ratio for each of the series of stored time differences may be determined as: Length(compressedString)/Length (uncompressed string).

In some embodiments, the processor may determine that the sequence of communication events have been generated by a computing agent (e.g., Internet BOT or programmatic script). The processor may identify that sequences of communication events as having been generate computing agents based on analysis of compression metrics. Compression metrics may be based on a compression ratio of data associated with the sequence of communication events. In scenarios where the processor determines that the compression metric meets a threshold value, the processor may generate a signal for indicating that the sequence of communication events is generated by a computing agent. In some embodiments, the threshold value may be a proxy for determining that a sequence of communication events may be based on a sequenced pattern of transmission, or other programmatic script.

As described herein, computing agents may be Internet BOTs or computing devices executing programmatic scripts conducting operations having deterministic or pseudo-deterministic characteristics. In some scenarios, the above-described threshold value may be associated or correlated with identified patterns among an encoded data string or data sequence. Accordingly, the processor, based on the entropy approximation measure determined at operation 404, may determine whether the sequence of communication events may have been generated by a computing agent (e.g., observed pattern in sequence of communication events) or by human user input (e.g., seemingly random sequence of communication events).

In some embodiments, the entropy approximation measure may be correlated with principles of Kolmogorov complexity. Kolmogorov complexity of an object may be defined as the size of the shortest program that can generate that object. As it may not be practical to precisely compute Kolmogorov complexity (e.g., not Turing computable), embodiments of the present disclosure may be based on heuristics for approximating Kolmogorov complexity of sequences of communication events.

In some embodiments (as described), the processor may determine that the sequence of communication events is generated by a computing agent based on a Kolmogorov complexity approximation associated with the data representing the sequence of communication events. In some embodiments, approximating the Kolmogorov complexity may be based on generating a compression metric via a compression ratio of the data associated with the sequence of communication events.

In some other embodiments, the processor may determine that the sequence of communication events is generated by a computing agent by determining, based on an entropy approximation spectrum and prior domain knowledge, that classification of the entropy approximation measure along the entropy approximation spectrum corresponds to communication events generated by computing agents.

As a non-limiting example, prior domain knowledge may indicate that sequences of communication events associated with a lower end and a higher end of the entropy spectrum may be more likely generated by computing agents, and that sequences of communication events associated with a "middle" region of the entropy spectrum may be likely generated by human user input. When classifying sequences of communication events, embodiments of the threat detection server 110 may conduct operations based on population statistics and prior domain knowledge, thereby providing unsupervised classification methods.

A simplified example of a sequence of events generated by a computing agent being associated with a lower end and a higher end of an entropy spectrum will be provided. A single line of Python programming for generating a series of random numbers may have very high approximate entropy and a small Kolmogorov complexity. By contrast, a single line of Python programming for generating a string including a series of the number 1: "111111111111 . . . " may have low approximate entropy and a small Kolmogorov complexity. Accordingly, in some scenarios, the threat detection server 110 may classify sequences of communication events based on prior domain knowledge associated with entropy approximations.

At operation 406, the processor generates a threat prediction value based on an anomaly classification model and the entropy approximation measure associated with the sequence of communication events. In some embodiments, the anomaly classification model may be trained based on prior sequences of communication events to identify a non-outlier anomaly range associated with the at least one event attribute.

In some embodiments, the anomaly classification model may be an unsupervised anomaly classification model. For example, the anomaly classification model may be an isolation forest model, and the processor may train the isolation forest model based on stored data records associated with prior sequences of communication events.

In some embodiments, the threat prediction value may be generated based on classification of the entropy approximation measure relative to the non-outlier anomaly range associated with the at least one attribute for identifying a potential threat.

As an illustrating example, the threat detection server 110 may conduct operations to train the anomaly classification model based on prior communication events. The model training may generate two or more benchmark ranges used for classifying sequences of communication events. For ease of exposition, the benchmark ranges may be defined such that determined entropy approximations classified: (i) in a 0 to 0.5 range may be considered nominal; (ii) in a 0.7 to 1 range may be considered outliers and anomalies; and (iii) in the 0.5 to 0.7 range may be considered non-outlier anomalies.

In some embodiments, the model training may define the above described classification thresholds based on a rationale that unscrupulous users may not wish to generate communication events that may be identified as extreme outliers, thereby avoiding generation of communication events that may be identified as outliers. However, the model training may define a non-outlier anomaly range that identifies sequences of communication events that: (1) are not considered nominal patterns of communication events and (2) are not outlier—anomaly values (e.g., deliberately avoided by programmatic scripts associated with unscrupulous users).

Thus, in some embodiments, the processor may classify determined entropy approximations associated with a sequence of communication events for determining whether the sequence may be a potential threat within the communication network. As illustrated in some examples herein, entropy approximation may be a proxy for determining whether patterns deduced from sequences of communication events deviate from expected patterns communication events within the communication network.

As a simplified example, a Service Account may generate, at predefined time intervals, sequences of communication events for "network status checks" of client devices within the communication network. Such sequences of communication events may be associated with an encoded data string representing a time difference between successive communication events. In the present example, the encoded data string may be highly compressed (e.g., low entropy approximation). At operation 406, the processor may determine that a compression metric associated with the encoded data string may be associated with a nominal range classification.

In a scenario where the Service Account may be compromised by an unscrupulous user, communication events may be generated at time intervals that may deviate from the predefined time intervals. Accordingly, an encoded data string representing communication events based on the compromised Service Account may not be highly compressible, at least, because the periodicity of the sequence of communication events may not be at the predefined intervals. At operation 406, the processor may determine that a compression metric associated with this latter encoded data string may be associated with a non-outlier anomaly range classification. In the present example, the compression metric associated with this latter encoded data string may not be considered to be an outlier, as the compromised Service Account may continue to generate, in part, communication events associated with "network status checks" of client devices.

In the latter scenario (e.g., compromised Service Account), the processor, at operation 408, may transmit a signal for communicating that the sequence of communication events is a potential threat within the communication network based on the threat prediction value. In some embodiments, the signal for communicating the potential threat may be a message for display at a user interface. In some embodiments, the signal for communicating the potential threat may include a signal including a security action signal. The security action signal may be configured to interrupt or halt transmission of future sequences of communication events among identified client devices that may be associated with the identified potential threat.

As an example, where the processor identifies that an analyzed sequence of communication events may be associated with a potential threat (e.g., one or more client devices having undesired malware beaconing operations being generated as a background process), the processor may generate security rules for interrupting communication events to or from the identified client devices.

In some embodiments, the threat prediction value may include an indication of ranges associated with classifications (e.g., nominal, non-outlier anomaly range, outlier anomaly range). Above described scenarios are illustrating examples only, and other classification range definitions may be contemplated.

In scenarios where sequences of communication events may be classified as nominal or extreme outlier anomalies, the processor, at operation 408, may transmit a signal for communicating that there may be no identified potential threats.

Some of the above-described examples may be based on unsupervised anomaly classification models. Unsupervised anomaly classification models may be beneficial when it may be desirable to unnecessarily impute bias to the model. However in some embodiments, the anomaly classification models may be supervised models, such as Bayesian-based models, among other examples. In scenarios that supervised models may be implemented, the threat detection server 110 may be configured to impute prior domain knowledge for defining training of the anomaly classification models.

In some embodiments, the threat detection server 110 may be configured to focus on identifying potential threats associated with sequences of communication events generated by computing agents. Thus, in some scenarios, the processor may generate the threat prediction value (e.g., operation 406) in response to previously determining that a sequence of communication events was generated by a computing agent, and not generated by human user input.

In some embodiments, the above-described examples of the non-outlier anomaly range may be defined as being between a nominal range and an outlier anomaly range. In some embodiments, the processor may determine that, in response to classification of an entropy approximation measure associated with at least one of the nominal range or the outlier range, the sequence of communication events under analysis may be determined to be a non-potential threat within the communication network.

In some embodiments, a signal for communicating that the sequence of communication events is a potential threat (e.g., generated an transmitted at operation 408) may include a security action signal for interrupting transmission of future sequences of communication events among identified client devices associated with the analyzed sequence of communication events.

To illustrate features of embodiments described in the present disclosure, a further example associated with determining whether Internet webpage browsing activity may be: (a) generated by a computing agent; or (b) a potential threat within a communication network will be described. A communication event may be defined by a combination of a source Internet Protocol (IP) address, a destination IP address, a Port, and a Protocol. For example, Internet web browsing to a webpage RBC.com from a client device with IP address 10.1.1.1 may be defined by <10.1.1.1, {RBC.com IP}, 443, https>. The Internet web browsing may be a sequence of request-response pairs associated with multiple attributes, such as bytes sent/received, timestamps, URL requested, action taken by a proxy server (e.g., if the communication event was blocked or allowed), content type requested (e.g., image, text, etc.), among other examples. Based on the Internet web browsing events (e.g., communication events) detected and stored within proxy logs over a period of time, the threat detection server 110 may be configured to determine sequences of communication events that may be generated by computing agents (e.g., programmatic scripts, Internet BOTs) as opposed to being generated by human user input.

Continuing with the present example, a Kolmogorov complexity associated with communication events may be approximated based on attributes associated with sequences of communication events. For instance, attributes may include URLs accessed, times of requests, or content types requested, among other examples. The threat detection server 110 may store attributes over time as time-series data sets or time-ordered sequences (e.g., sequences of URLs, timestamps, content types, etc.) and may encode the data sets as encoded data strings.

In a simplified example, the threat detection server 110 may determine whether the sequence of communication events may be a potential threat based on multiple encoded data strings representing respective attributes. The threat detection server 110 may determine an entropy approximation measure for the respective encoded data strings. For instance, the threat detection server 110 may determine compression metrics for the respective encoded data strings and may, subsequently, conduct operations for determining whether the sequence of communication events may be associated with a potential threat within the communication network, in accordance with embodiments described herein.

In some embodiments, because the threat detection server 110 may determine whether the sequence of communication events may be a potential threat based on multiple encoded data strings (e.g., associated with each attribute), the threat detection server 110 may be configured to normalize the encoded data strings to ameliorate differences in string lengths/sizes. For example, a likelihood that a longer data string may be compressed may be higher than the likelihood that a relatively shorter data string may be compressed. In some embodiments, the threat detection server 110 may compare an average compression ratio and standard deviation measure for various data string lengths (e.g., 0 to 5, 5 to 10, 10 to 15, etc.), and may be configured to normalize the compression ratios by computing a deviation measure from respective mean values of a data string length category.

Figure 5:
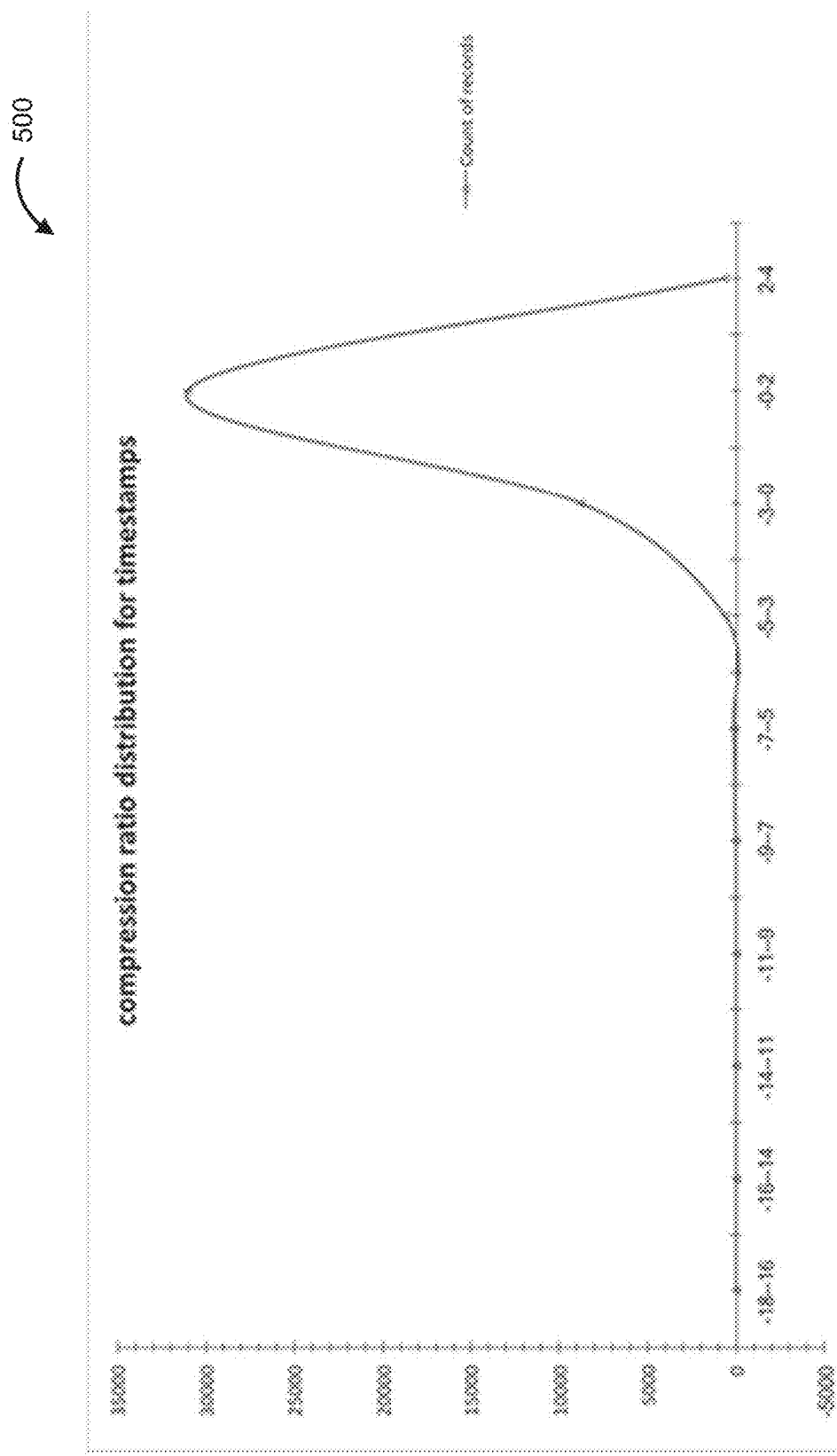
FIG. 5 illustrates a graphical distribution of normalized compression ratios for a sequence of time stamps associated with a sequence of communication events, in accordance with embodiments of the present disclosure.

Reference is made to FIG. 5, which is a graphical distribution 500 of normalized compression ratios for a sequence of time stamps associated with a sequence of communication events, in accordance with an embodiment of the present disclosure. In some embodiments, the threat detection server 110 (FIG. 1) may compute a compression ratio or metric for a data string associated with an attribute (e.g., URL, timestamp, content type, etc.) on a period basis. A deviation or change of the compression ratio/metric to a negative side of the distribution may indicate that communication event requests may be generated according to a pattern (e.g., periodicity). A deviation or change of the compression ratio/metric to a positive side may indicate that sequences of communication events may be generated in an increasingly random sequence, and in a less patterned way.

Figure 6:
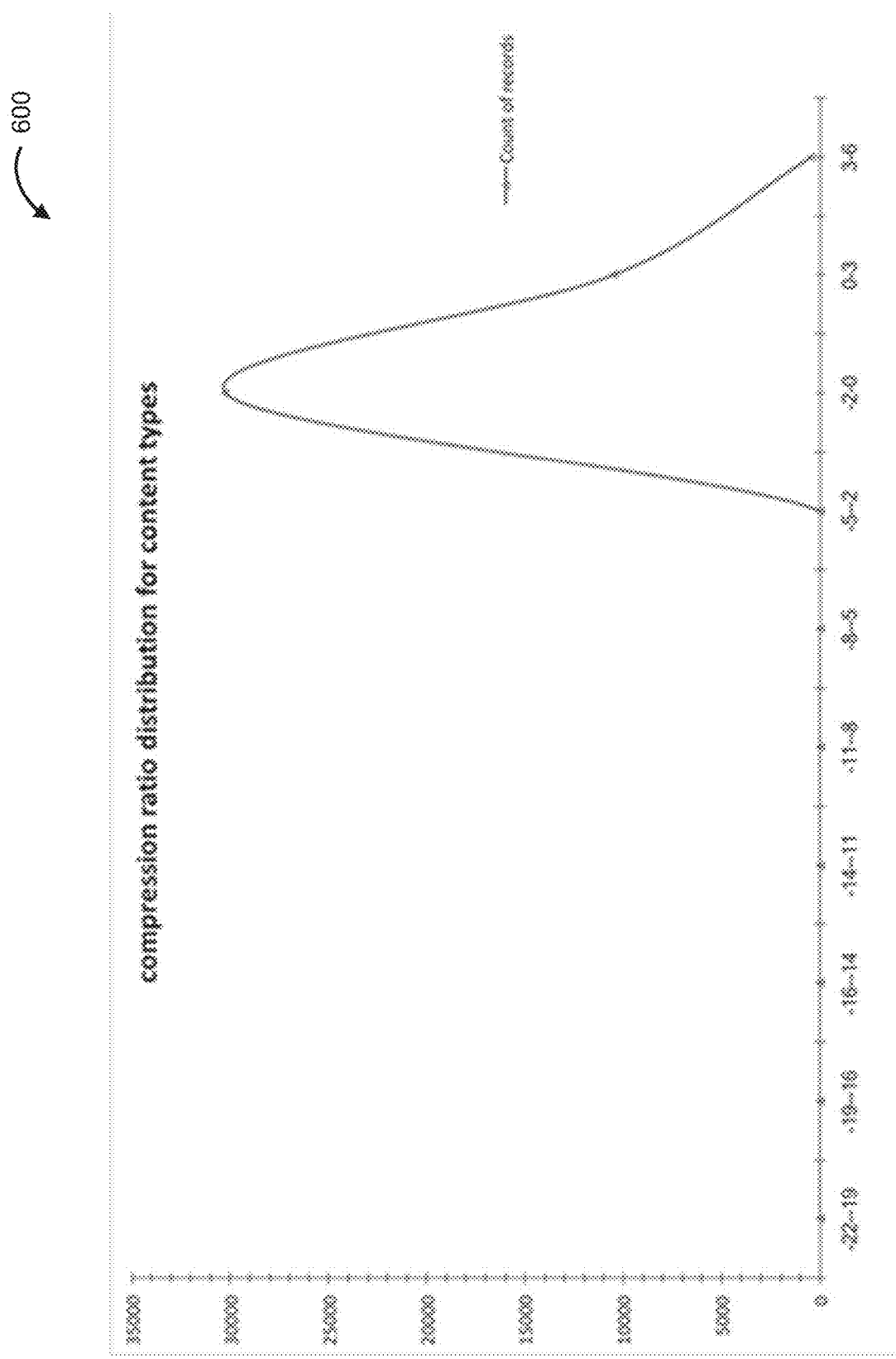
FIG. 6 illustrates a graphical distribution of normalized compression ratios for a sequence of requested content types associated with a sequence of communication events, in accordance with embodiments of the present disclosure.

Reference is made to FIG. 6, which illustrates a graphical distribution 600 of normalized compression ratios for a sequence of requested content types for sequences of communication events, in accordance with an embodiment of the present disclosure. In some embodiments, the threat detection server 110 may compute a compression ratio for a data string associated with content type. A deviation to a negative side of the graphical distribution 600 may indicate that communication event requests may be occurring according to a request pattern (e.g., sequence of content type requests, such as text, image, text, image, text, etc.). A deviation to a positive side of the graphical distribution 600 may indicate that the communication event requests may be occurring without periodicity (e.g., somewhat random) (e.g., sequence of content type requests, such as text, image, image, text, video, . . . ).

Figure 7:
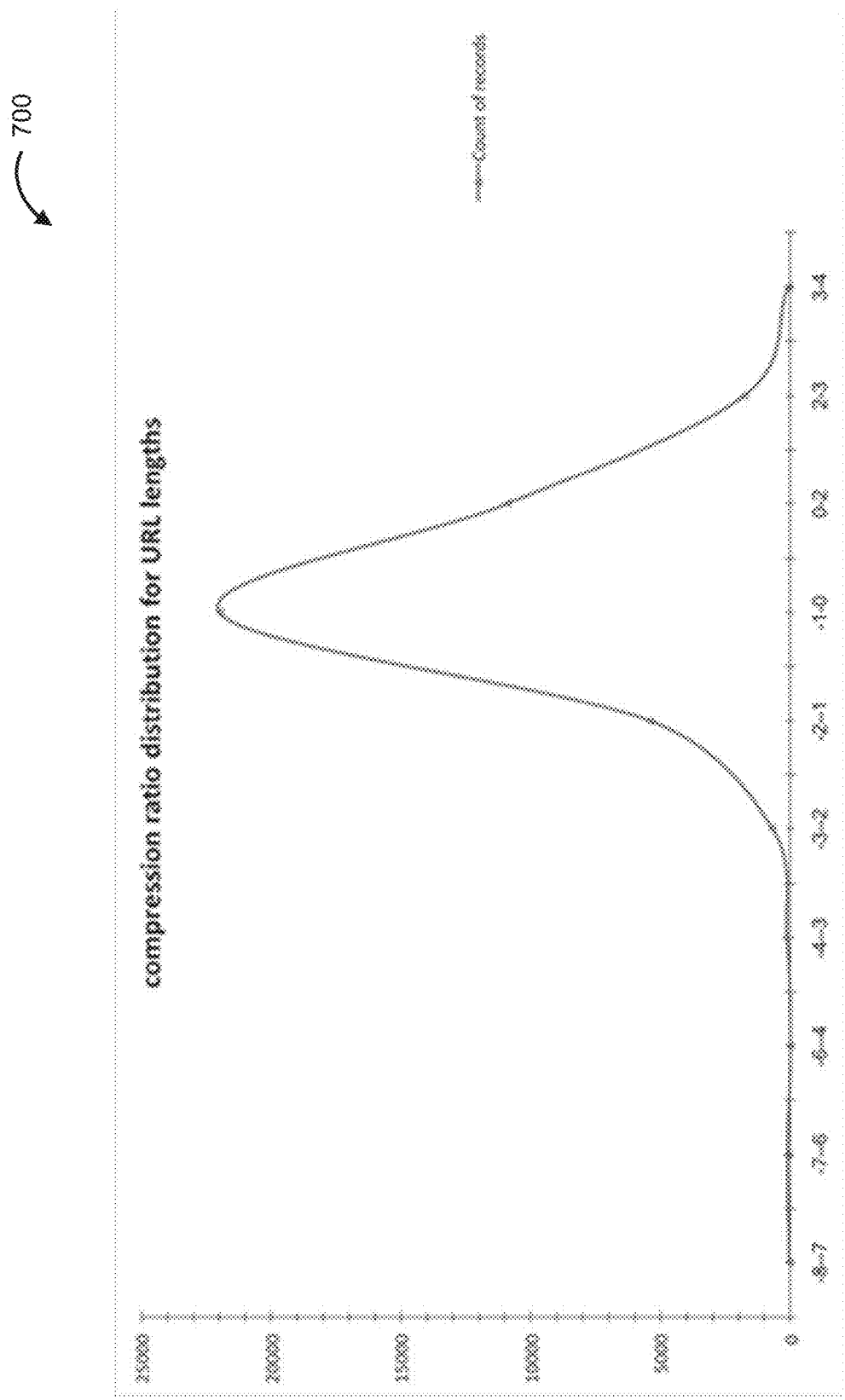
FIG. 7 illustrates a graphical distribution of normalized compression ratios for a sequence of sizes of URL lengths associated with sequences of communication events, in accordance with embodiments of the present disclosure.

Reference is made to FIG. 7, which illustrates a graphical distribution 700 of normalized compression ratios for a sequence of sizes of URL lengths associated with sequences of communication events, in accordance with embodiments of the present disclosure. In some embodiments, the threat detection server 110 (FIG. 1) may compute a compression ratio for a data string associated with length values of URLs. A negative deviation from zero of the graphical distribution 500 may indicate that a pattern associated with length values of URLs being requested may be present (e.g.,/upload/,/receive,/call/, etc.). A positive deviation from zero of the graphical distribution 500 may indicate that the sequence of URL sizes being requested may not follow any pattern (e.g., somewhat random).

Continuing with the present example, correlation of the respective attributes (e.g., timestamps, URL length, and content type) may be based on Pearson correlation coefficients. Table 1 illustrates example Pearson correlation coefficients for the respective attributes.

TABLE 1

| PEARSON CORRELATION COEEFFIENTS | Timestamps | URL | Content Type |
|---|---|---|---|
| Timestamps | N/A | WEAK (~0.2) | WEAK (~0.2) |
| URL | WEAK (~0.2) | N/A | Moderate (~0.5) |
| Content Type | WEAK (~0.2) | Moderate (~0.5) | N/A |

In the present example, a moderate correlation between content type and URL sizes may illustrate that: when there is greater periodicity or pattern associated a sequence of lengths of URLs, the sequence of computing device requests for content types may be increasingly monotonous. In the present example, he respective attributes may appear to exhibit a negative deviation from zero (see e.g., FIGS. 5 to 7), thereby indicating that the communication events may be initiated by a computing agent or programmatic scripts.

Reference is made to FIG. 8, which illustrates an extract of a proxy log 800, in accordance with an embodiment of the present disclosure. In FIG. 6, the content type requests may include <application/vnd.microsoft.rtc.autodiscover+xml>, which may be associated with an Microsoft™ operated BOT. In the example proxy log illustrated in FIG. 8, communication events are logged generally twice a day at approximately the same time of day. For instance, the series of communication events may be associated with computing devices managing monotonous tasks, such as software patch updates, certificate renewals, etc. Thus, a threat detection server 110 may determine that the communication events may have been generated by programmatic means. In the present example, computing devices generating monotonous tasks may not necessarily be unscrupulous devices, and may not necessarily be conducting potentially malicious actions.

Reference is made to FIG. 9, which illustrates an extract of a proxy log 900, in accordance with an embodiment of the present disclosure. In FIG. 9, the latter communication event requests were made a week apart at approximately the same time of day and were made to an external destination IP address. The communication event requests included content type attributes that were empty. In the present example, the threat detection server 110 may identify the communication events as being associated with a potentially unscrupulous computing device.

In some embodiments, the threat detection server 110 may conduct operations for distinguishing computing devices as potentially unscrupulous computing devices (e.g., for conducting ill-intentioned communication events, such as password guessing operations, or the like) from computing devices operating as intended by programmatic scripts. In some examples, the threat detection server 110 may consider one or more additional contextual features, such as popularity of a destination address, when determining whether a computing device may be conducting unscrupulous operations. A popularity of a destination address may be associated with log-normal distribution of a number of unique computing device requests (e.g., visitors to an Internet web page).

Figure 10:
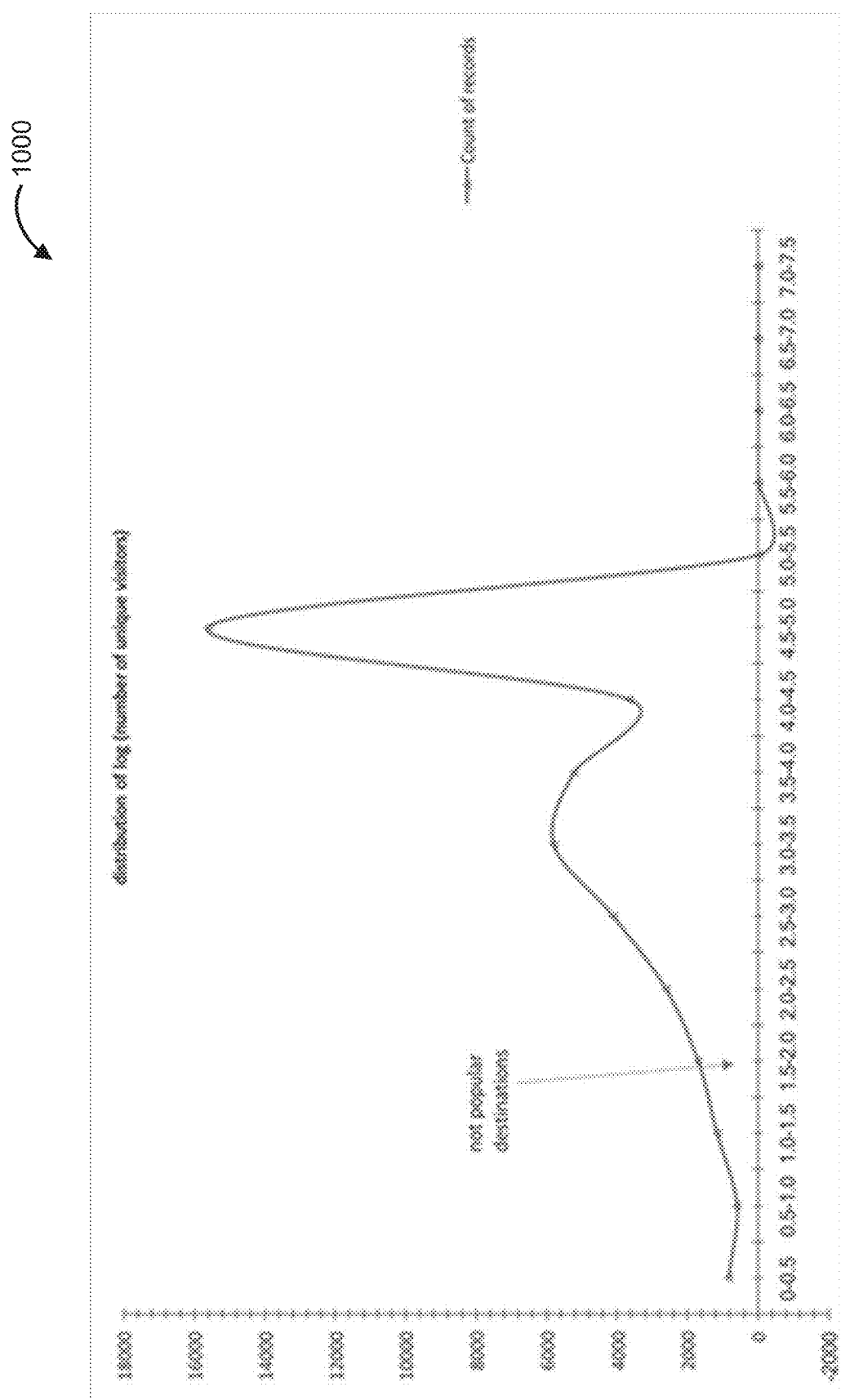
FIG. 10 illustrates a distribution of destination address popularity, in accordance with an embodiment of the present disclosure.

Reference is made to FIG. 10, which illustrates a distribution 1000 of destination address popularity, in accordance with an embodiment of the present disclosure. In FIG. 10, two distinct populations of destinations are illustrated.

In FIG. 10, the "left tail" of the first population may be of interest. Sample Internet web page domains associated with a first population (e.g., on the left hand side) may include: thrtle.com, google.com.eu, a.teads,tv. Sample Internet web page domains associated with the second population (e.g., on the right hand side) may include: ctd.windowsupdate.com, lyncdiscover.rbc.com, www.msftconnecttest.com.

In the present example, threat detection server 110 may generate thresholds based on destination popularity, and the threat detection server 110 may be configured to deduce sequences of communication events that may originate from unscrupulous computing devices and sequences of communication events that may not originate from unscrupulous computing devices (e.g., sequences of communication events for destinations associated with Microsoft, Akamai, etc.) for a communication network.

In some scenarios, it may be contemplated that malware operating on a computing device may request communication events via popular destination addresses, such as Facebook™, LinkedIn™ or Instagram™ for transmitting communication messages to command-and-control devices external to a communication network and additional operations may be conducted to identify such communication paths. Accordingly, the threat detection server 110 may additionally be configured to deduce whether a computing device may be an unscrupulous computing device for transmitting communication events for unintended or malicious purposes based on determining whether compression metrics or ratios associated with series of communication events originating from particular computing devices may deviate from a normalized or average ratio associated with the respective computing devices.

Figure 11:
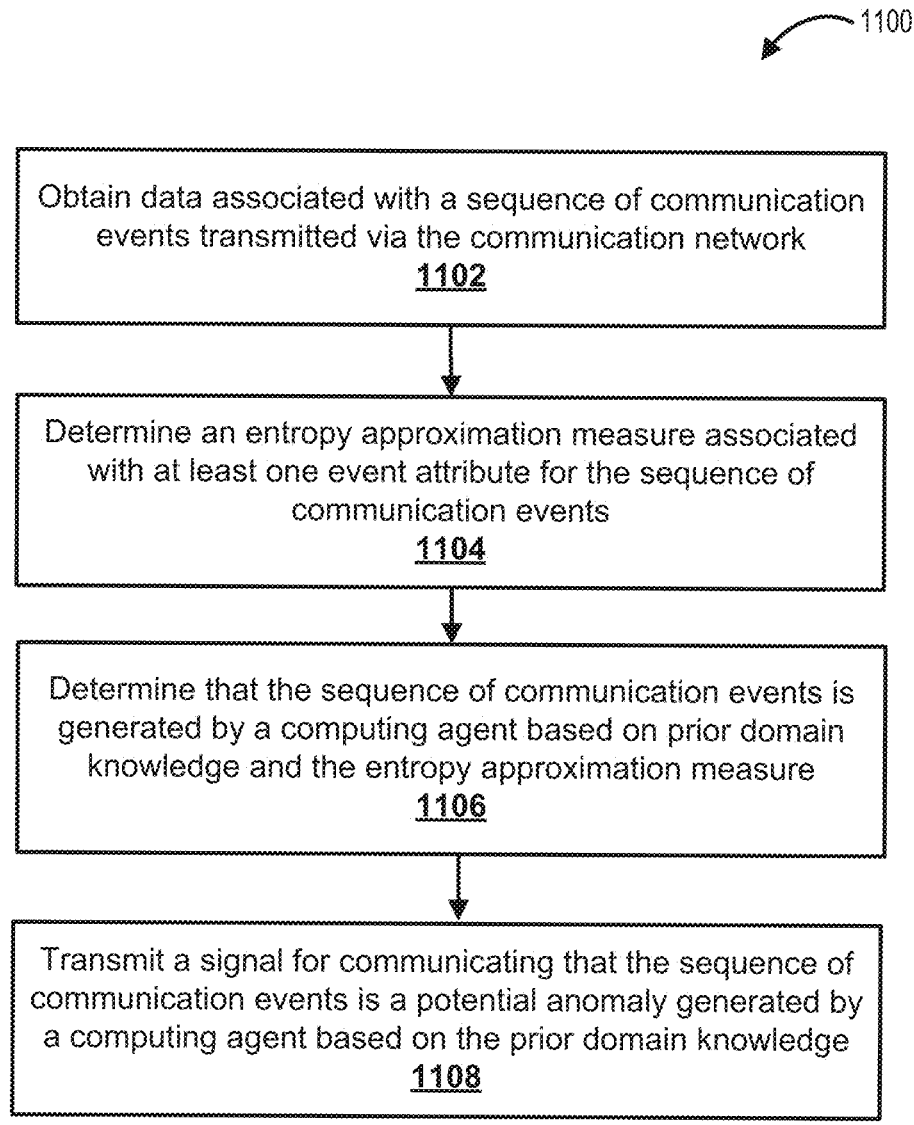
FIG. 11 illustrates a method for monitoring suspicious communication network traffic, in accordance with an embodiment of the present disclosure.

Reference is made to FIG. 11, which illustrates a flowchart of a method 1100 for monitoring suspicious communication network traffic, in accordance with embodiments of the present disclosure. The method 1100 may be conducted by the processor 112 of the system 110 (FIG. 1). Processor-executable instructions may be stored in the memory 116 and may be associated with the threat detection application 118 or other processor-executable applications not illustrated in FIG. 1. The method 1100 may include operations such as data retrievals, data manipulations, data storage, or other operations, and may include computer-executable operations.

At operation 1102, the processor may obtain data associated with a sequence of communication events transmitted via the communication network. The processor may obtain data from the memory 116 or the data store 120 of the threat detection server 110 (FIG. 1). In some embodiments, the processor may obtain data from client devices 130 or computing devices associated with the network firewall 152.

The obtained data may include data records for recording details of communication events among client devices of the communication network. For example, the data records may include data associated with device or destination addresses (e.g., uniform resource locators requested), time stamps, bytes sent/received, action conducted by the network firewall (e.g., communication event blocked or allowed), content type requested (e.g., image, text, etc.), among other examples.

In some embodiments, the data associated with the sequence of communication events may include encoded data values. To illustrate, encoded data values may include data strings representing a series of time differences between communication events, such as time differences between accesses to a particular webpage destination address.

In some embodiments, data records or data sets representing prior sequences of communication events may be used for training anomaly classification models. Data sets representing prior sequences of communication events may be stored in the data storage 120 of the threat detection server 110. In some embodiments, the threat detection server 110 may train anomaly classification models such that the threat detection server 110 may determine whether future sequences of communications may be a potential threat within the communication network.

At operation 1104, the processor may determine, based on the obtained data, an entropy approximation measure associated with at least one event attribute for the sequence of communication events. As a non-limiting example, an event attribute may include time differences between timestamps of communication events in a sequence.

In some embodiments, the sequence of communication events may be associated with a time-series data set. The processor may determine an entropy approximation measure for quantifying an amount of regularity or unpredictable fluctuations over the time-series data set. In some embodiments, the entropy approximation measure may be a proxy for determining whether a subject sequence of communication events may be deviating from an expected pattern of communication events within the communication network.

In some embodiments, the entropy approximation measure may include a compression metric based on a compression ratio of the data associated with the sequence of communication events. In the above example, the compression ratio for each of the series of stored time differences may be determined as: Length(compressedString)/Length (uncompressed string). The compression metric and ratios described herein are examples, and other methods of determining compression metrics associated with data may be contemplated.

At operation 1106, the processor may determine that the sequence of communication events is generated by a computing agent based on prior domain knowledge and the entropy approximation measure. The prior domain knowledge may be based on an anomaly classification model trained based on prior sequences of communication events to identify a non-outlier anomaly range associated with the at least one event attribute.

In some embodiments, determining that the sequence of communication events is generated by the computing agent is based on classification of the compression ratio of the obtained data being within the non-outlier anomaly range.

For example, the anomaly classification model may be trained to adaptively identify a threshold value for indicating that sequences of communication events are generated by a computing agent. In some embodiments, the processor may adaptively identify updates or changes to the threshold value over time, and the threshold value may be adaptively updated over time based on anomaly classification model training using additional data representing sequences of communication events.

In an example where sequences of communication events associated with an event attribute may have a substantially regular pattern, a compression ratio of data associated with the subject sequences of communication events may be relatively high. In a scenario where an unscrupulous user attempts to compromise a client device generating the subject sequences of communication devices, the expected sequence exhibiting a substantially regular pattern may deviate from the substantially regular pattern. In the present scenario, the compression ratio of newly obtained data associated with communication events may change and be less than a compression ratio threshold value, where the compression ratio threshold value may have been determined based on anomaly classification model training.

The above-described example is based on identifying a potential anomaly generated by a computing agent where a patterned sequence of communication events may be expected. In some other examples, the processor may conduct operations to identify a potential anomaly generated by a computing agent where a non-patterned or seemingly random sequence of communication events may be expected.

At operation 1108, the processor may transmit a signal for communicating that the sequence of communication events is a potential anomaly generated by a computing agent based on the prior domain knowledge. In some examples, the prior domain knowledge may be one or more threshold values identified by training operations of the anomaly classification model.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for monitoring suspicious communication network traffic comprising:
   a processor; and
   a memory coupled to the processor and storing processor-executable instructions that, when executed, configure the processor to:
   obtain data associated with a sequence of communication events transmitted via the communication network;

determine, based on the obtained data, an entropy approximation measure associated with at least one event attribute for the sequence of communication events;

generate a threat prediction value based on an anomaly classification model and the entropy approximation measure associated with the sequence of communication events, wherein the anomaly classification model is trained based on prior sequences of communication events to identify a non-outlier anomaly range associated with the at least one event attribute, and wherein the threat prediction value is generated based on classification of the entropy approximation measure relative to the non-outlier anomaly range associated with the at least one attribute for identifying a potential threat; and transmit a signal for communicating that the sequence of communication events is a potential threat within the communication network based on the threat prediction value, wherein the entropy approximation measure includes a compression metric based on a compression ratio of the data associated with the sequence of communication events.

2. The system of claim 1, wherein processor-executable instructions, when executed, configure the processor to:
determine that the sequence of communication events is generated by a computing agent based on an approximation of Kolmogorov complexity associated with the data representing the sequence of communication events; and
generate the threat prediction value for the sequence of communication events generated by the computing agent.

3. The system of claim 2, wherein determining that the sequence of communication events is generated by a computing agent includes:
generating a compression metric based on a compression ratio of the data associated with the sequence of communication events; and
determining that the compression metric meets a threshold value for indicating that the sequence of communication events is generated by a computing agent.

4. The system of claim 2, wherein determining that the sequence of communication events is generated by a computing agent includes:
determining, based on an entropy approximation spectrum and prior domain knowledge, that classification of the entropy approximation measure along the entropy approximation spectrum corresponds to communication events generated by computing agents.

5. The system of claim 2, wherein the computing agent includes at least one of an Internet BOT, a programmatic script, or a computing device configured to automate repetitive operations.

6. The system of claim 1, wherein the non-outlier anomaly range is between a nominal range and an outlier range, and wherein the sequence of communication events is determined to be a non-potential threat in response to classification of the entropy approximation measure associated with at least one of the nominal range or the outlier range.

7. The system of claim 1, wherein the anomaly classification model includes an unsupervised isolation forest extracting attributes associated with prior sequence of communication events, wherein the attributes include at least one of communication network traffic frequency, upload data rate, download data rate, communication destination popularity, or time differences between communication events.

8. The system of claim 1, wherein the data associated with the sequence of communication events includes encoded data associated with a sequence of time differences between successive pairs of communication events in the sequence.

9. The system of claim 1, wherein the processor-executable instructions, when executed, configure the processor to:
identify at least two client devices associated with the sequence of communication events transmitted via the communication network,
and wherein the signal for communicating that the sequence of communication events is a potential threat includes a security action signal for interrupting transmission of future sequences of communication events among the identified at least two client devices.

10. A method for monitoring suspicious communication network traffic comprising:
obtaining data associated with a sequence of communication events transmitted via the communication network;
determining, based on the obtained data, an entropy approximation measure associated with at least one event attribute for the sequence of communication events;
generating a threat prediction value based on an anomaly classification model and the entropy approximation measure associated with the sequence of communication events, wherein the anomaly classification model is trained based on prior sequences of communication events to identify a non-outlier anomaly range associated with the at least one event attribute, and wherein the threat prediction value is generated based on classification of the entropy approximation measure relative to the non-outlier anomaly range associated with the at least one attribute for identifying a potential threat; and
transmitting a signal for communicating that the sequence of communication events is a potential threat within the communication network based on the threat prediction value,
wherein the entropy approximation measure includes a compression metric based on a compression ratio of the data associated with the sequence of communication events.

11. The method of claim 10, comprising:
determining that the sequence of communication events is generated by a computing agent based on an approximation of Kolmogorov complexity associated with the data representing the sequence of communication events; and
generating the threat prediction value for the sequence of communication events generated by the computing agent.

12. The method of claim 11, wherein determining that the sequence of communication events is generated by a computing agent includes:
generating a compression metric based on a compression ratio of the data associated with the sequence of communication events; and
determining that the compression metric meets a threshold value for indicating that the sequence of communication events is generated by a computing agent.

13. The method of claim 11, wherein determining that the sequence of communication events is generated by a computing agent includes:

determining, based on an entropy approximation spectrum and prior domain knowledge, that classification of the entropy approximation measure along the entropy approximation spectrum corresponds to communication events generated by computing agents.

14. The method of claim 10, wherein the non-outlier anomaly range is between a nominal range and an outlier range, and wherein the sequence of communication events is determined to be a non-potential threat in response to classification of the entropy approximation measure associated with at least one of the nominal range or the outlier range.

15. The method of claim 10, wherein the anomaly classification model includes an unsupervised isolation forest extracting attributes associated with prior sequence of communication events, wherein the attributes include at least one of communication network traffic frequency, upload data rate, download data rate, communication destination popularity, or time differences between communication events.

16. The method of claim 10, wherein the data associated with the sequence of communication events includes encoded data associated with a sequence of time differences between successive pairs of communication events in the sequence.

17. The method of claim 10, comprising:
identifying at least two client devices associated with the sequence of communication events transmitted via the communication network,
and wherein the signal for communicating that the sequence of communication events is a potential threat includes a security action signal for interrupting transmission of future sequences of communication events among the identified at least two client devices.

18. A non-transitory computer-readable medium or media having stored thereon machine interpretable instructions which, when executed by a processor, cause the processor to perform a computer-implemented method for monitoring suspicious communication network traffic, the method comprising:
obtaining data associated with a sequence of communication events transmitted via the communication network;
determining, based on the obtained data, an entropy approximation measure associated with at least one event attribute for the sequence of communication events;
generating a threat prediction value based on an anomaly classification model and the entropy approximation measure associated with the sequence of communication events, wherein the anomaly classification model is trained based on prior sequences of communication events to identify a non-outlier anomaly range associated with the at least one event attribute, and wherein the threat prediction value is generated based on classification of the entropy approximation measure relative to the non-outlier anomaly range associated with the at least one attribute for identifying a potential threat; and
transmitting a signal for communicating that the sequence of communication events is a potential threat within the communication network based on the threat prediction value,
wherein the entropy approximation measure includes a compression metric based on a compression ratio of the data associated with the sequence of communication events.

19. A system for monitoring suspicious communication network traffic comprising:
a processor; and
a memory coupled to the processor and storing processor-executable instructions that, when executed, configure the processor to:
obtain data associated with a sequence of communication events transmitted via the communication network;
determine, based on the obtained data, an entropy approximation measure associated with at least one event attribute for the sequence of communication events;
determine that the sequence of communication events is generated by a computing agent based on prior domain knowledge and the entropy approximation measure, the prior domain knowledge based on an anomaly classification model trained based on prior sequences of communication events to identify a non-outlier anomaly range associated with the at least one event attribute; and
transmit a signal for communicating that the sequence of communication events is a potential anomaly generated by a computing agent based on the prior domain knowledge,
wherein the entropy approximation measure is based on a compression ratio of the data associated with the sequence of communication events.

20. The system of claim 19, wherein determining that the sequence of communication events is generated by the computing agent is based on classification of the compression ratio of the obtained data being within the non-outlier anomaly range.

* * * * *